US012658349B2

(12) United States Patent
Hamawaki et al.

(10) Patent No.: US 12,658,349 B2
(45) Date of Patent: Jun. 16, 2026

(54) ACTUATOR AND OPTICAL DEVICE

(71) Applicant: NIDEC PRECISION CORPORATION, Tokyo (JP)

(72) Inventors: Makoto Hamawaki, Tokyo (JP);
Shigemi Takahashi, Tokyo (JP);
Shinya Miyahara, Tokyo (JP);
Nobuhiro Nishikawa, Tokyo (JP);
Hideaki Kamijo, Tokyo (JP)

(73) Assignee: NIDEC PRECISION CORPORATION, Tokyo (JP)

( * ) Notice: Subject to any disclaimer, the term of this patent is extended or adjusted under 35 U.S.C. 154(b) by 227 days.

(21) Appl. No.: 18/644,105

(22) Filed: Apr. 24, 2024

(65) Prior Publication Data

US 2024/0371558 A1    Nov. 7, 2024

(30) Foreign Application Priority Data

May 2, 2023    (JP) ................................. 2023-076066

(51) Int. Cl.
H04N 23/54        (2023.01)
H01F 7/20        (2006.01)
*H01F 7/06*        (2006.01)

(52) U.S. Cl.
CPC ............. H01F 7/204 (2013.01); H01F 7/206 (2013.01); *H01F 2007/062* (2013.01); *H01F 2007/208* (2013.01); *H04N 23/54* (2023.01)

(58) Field of Classification Search
CPC ............................... H04N 23/54; H01F 7/081
USPC ......................................................... 335/229
See application file for complete search history.

(56) References Cited

U.S. PATENT DOCUMENTS

| | | | | |
|---|---|---|---|---|
| 5,742,106 A | * | 4/1998 | Muraji | ............... H02K 41/0354 |
| | | | | 335/218 |
| 8,358,477 B2 | * | 1/2013 | Hase | ...................... G02B 7/102 |
| | | | | 359/822 |
| 9,178,393 B2 | | 11/2015 | Yano | |
| 10,574,127 B2 | * | 2/2020 | Takizawa | ............. H02K 11/215 |
| 2012/0188441 A1 | * | 7/2012 | Takizawa | ............. G03B 17/561 |
| | | | | 348/E5.026 |
| 2019/0267880 A1 | * | 8/2019 | Ichihashi | ............... H02K 37/12 |

(Continued)

FOREIGN PATENT DOCUMENTS

| | | |
|---|---|---|
| CN | 111474804 A | 7/2020 |
| JP | H10254008 A | 9/1998 |
| JP | 2010060011 A | 3/2010 |

(Continued)

*Primary Examiner* — Alexander Talpalatski
(74) *Attorney, Agent, or Firm* — HAUPTMAN HAM, LLP

(57)        ABSTRACT

An actuator includes a holder, a case, a support assembly, a first magnet, a second magnet, and a coil. The holder includes a sphere centered at a reference point and houses an optical module. The case houses the holder. The support assembly is in the case and supports the holder in a manner rotatable about the reference point. The first magnet is on a portion of the sphere in a first radial direction from the reference point. The second magnet is on a portion of the sphere in a second radial direction from the reference point. The coil is in the case and is energized to generate a magnetic field acting on the first magnet and the second magnet. The first magnet and the second magnet are located asymmetric to each other with respect to the reference point and have different lengths in a circumferential direction of the holder.

19 Claims, 23 Drawing Sheets

(56) References Cited

U.S. PATENT DOCUMENTS

2022/0107479 A1    4/2022  Sue

FOREIGN PATENT DOCUMENTS

| | | | |
|---|---|---|---|
| JP | 2022128741 | A | 9/2022 |
| WO | 2022210823 | A1 | 10/2022 |

* cited by examiner

Figure 10:
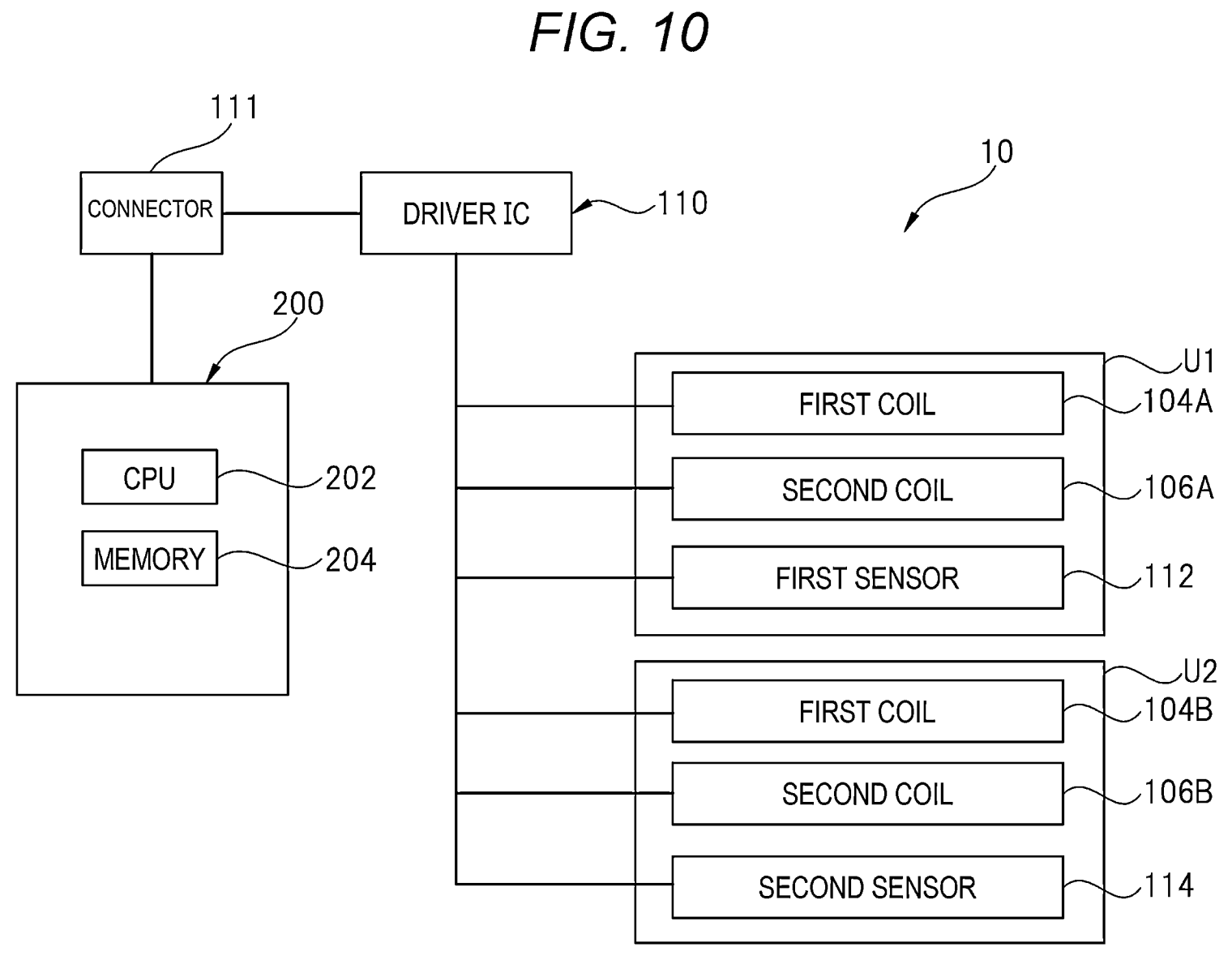

110 — DRIVER IC

111 — CONNECTOR

200

202 — CPU

204 — MEMORY

U1
104A — FIRST COIL
106A — SECOND COIL
112 — FIRST SENSOR

U2
104B — FIRST COIL
106B — SECOND COIL
114 — SECOND SENSOR

ACTUATOR AND OPTICAL DEVICE

RELATED APPLICATIONS

The present application claims priority to Japanese Application Number 2023-076066, filed May 2, 2023, the disclosure of which is hereby incorporated by reference herein in its entirety.

BACKGROUND

Technical Field

The present invention relates to an actuator and an optical device.

Description of the Background

An imaging device described in Patent Literature 1 includes two drive assemblies located on two adjacent side surfaces of a frame. Each drive assembly includes a coil and a magnet for generating a driving force. The two drive assemblies drive an imaging module. The imaging module is rotated about a first axis or a second axis.

CITATION LIST

Patent Literature

Patent Literature 1: Chinese Patent Application Publication No. 111474804

BRIEF SUMMARY

In the structure described in Patent Literature 1, a magnet included in the imaging module (drive target) and a coil located in the frame have substantially the same size. As the rotation angle of the drive target increases, the thrust (drive torque) for rotating the drive target decreases, thus limiting the range of angles at which the drive target is rotatable.

One or more aspects of the present invention are directed to a structure that increases the rotation angle of a drive target as compared with the structure described in Patent Literature 1.

An actuator according to one embodiments includes a holder, a case, a support assembly, a first magnet, a second magnet, and a coil. The holder includes a sphere centered at a predetermined reference point and houses a drive target. The case houses the holder. The support assembly is in the case and supports the holder in a manner rotatable about the predetermined reference point. The first magnet is on a portion of the sphere in a first radial direction from the predetermined reference point. The second magnet is on a portion of the sphere in a second radial direction from the predetermined reference point. The coil is in the case and is energized to generate a magnetic field acting on the first magnet and the second magnet. The first magnet and the second magnet are located asymmetric to each other with respect to the predetermined reference point and have different lengths in a circumferential direction of the holder.

An actuator according to another embodiment includes a holder, a case, a support assembly, a first magnet, a second magnet, and a coil. The holder houses a drive target. The case houses the holder. The support assembly is in the case and supports the holder in a manner rotatable about a predetermined reference point. The first magnet is on a portion of the holder in a first radial direction of a rotation circle from the predetermined reference point. The rotation circle is a path of the holder rotating about the predetermined reference point. The second magnet is on a portion of the holder in a second radial direction of the rotation circle from the predetermined reference point. The coil is in the case and is energized to generate a magnetic field acting on the first magnet and the second magnet. The first magnet and the second magnet are located asymmetric to each other with respect to the predetermined reference point and have different lengths in a circumferential direction of the rotation circle.

An optical device according to an embodiment includes an optical module with an optical axis, a holder, a case, a support assembly, a first magnet, a second magnet, and a coil. The holder includes a sphere centered at a predetermined reference point and houses the optical module. The case houses the holder. The support assembly is in the case and supports the holder in a manner rotatable about the predetermined reference point. The first magnet is on a portion of the sphere in a first radial direction from the predetermined reference point. The second magnet is on a portion of the sphere in a second radial direction from the predetermined reference point. The coil is in the case and is energized to generate a magnetic field acting on the first magnet and the second magnet. The first magnet and the second magnet are located asymmetric to each other with respect to the predetermined reference point and have different lengths in a circumferential direction of the holder.

The structures according to the above aspects of the present invention increase the rotation angle of a drive target to be driven as compared with the structure described in Patent Literature 1.

BRIEF DESCRIPTION OF DRAWINGS

FIG. 5 is a perspective view of a frame, bases, and shafts in the optical device shown in FIG. 1.

FIG. 6 is a perspective view of a holder and magnets in the optical device shown in FIG. 1.

FIG. 9 is a cross-sectional view of the optical device shown in FIG. 3 with a first magnet and a second magnet located asymmetric to each other with respect to the reference point.

FIG. 10 is a block diagram of the optical device shown in FIG. 1 driven using an external device.

DETAILED DESCRIPTION

Figure 1:
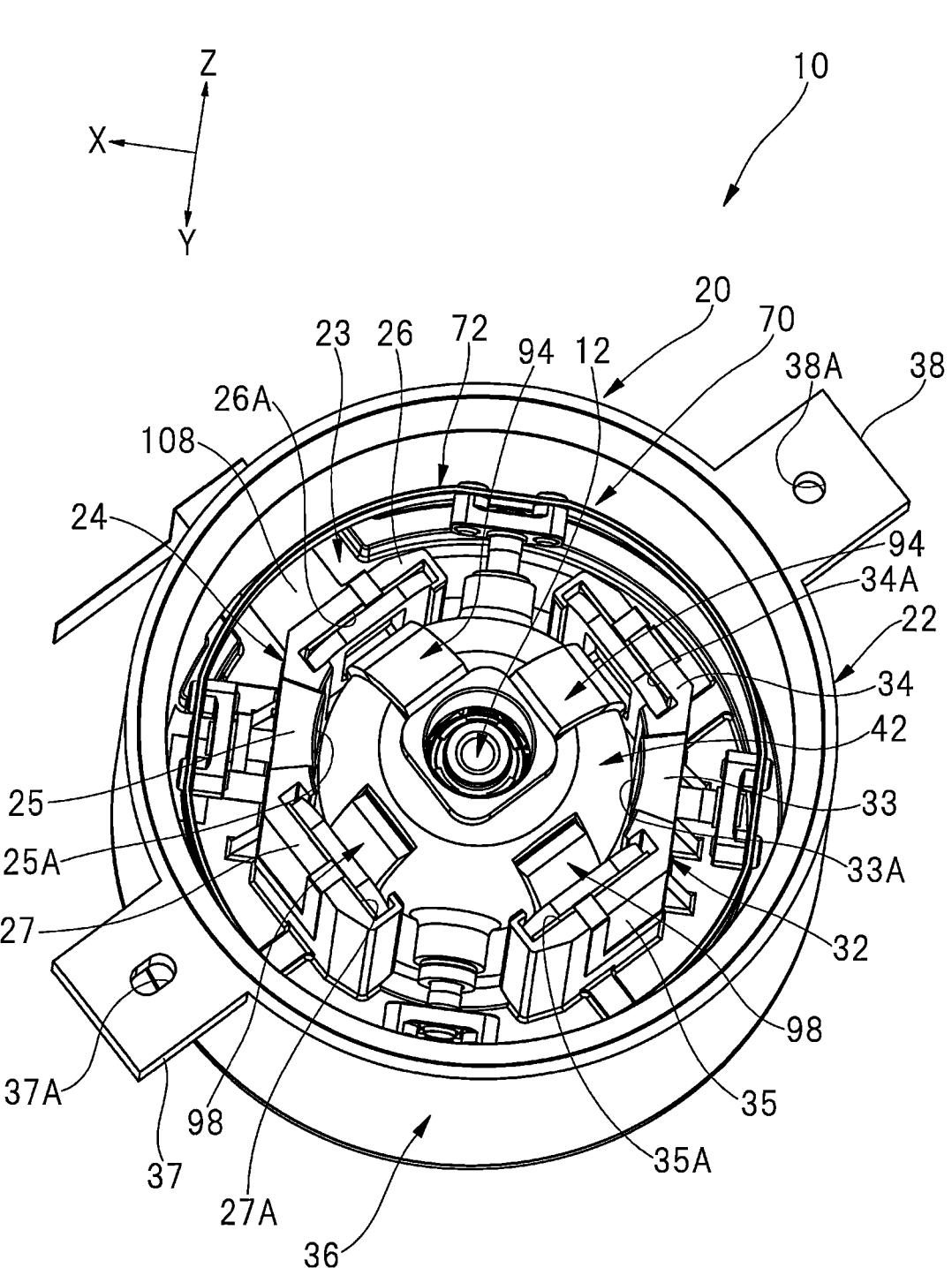
FIG. 1 is a perspective view of an optical device and an actuator according to a first embodiment, showing their internal structures.

Embodiments and modifications of the present invention will be described in detail below with reference to the drawings. In the drawings used to describe the embodiments and modifications, the same reference numerals denote the same or substantially the same components or elements. Such components or elements will not be basically described repeatedly. Unless otherwise specified, the terms such as first and second will be used herein simply to distinguish the components and will not represent a specific order or sequence.

Components in First Embodiment

FIG. 1 shows an optical device 10 and an actuator 20 according to a first embodiment. The optical device 10 and the actuator 20 are usable in an electronic device that controls, for example, the orientation and direction of an imaging camera or reflected light. More specifically, the optical device 10 and the actuator 20 are usable for devices featuring quietness, such as a surveillance camera and a video conferencing system.

The optical device 10 includes, for example, an optical module 12 and the actuator 20 for driving the optical module 12. The arrows X, Y, and Z shown in each figure denote X-direction, Y-direction, and Z-direction. For each of X-direction, Y-direction, and Z-direction, the tip of the arrow points in one direction (positive direction) and the base of the arrow points in the other direction (negative direction). In the examples described below, the directions may be referred to as the positive X-direction, the negative X-direction, the positive Y-direction, the negative Y-direction, the positive Z-direction, and the negative Z-direction.

When the optical module 12 is at an initial position before rotation (hereafter referred to as a reference position) in the present embodiment, X-direction is a pan-direction, Y-direction is a tilt-direction, and Z-direction is an optical axis direction. The relationship between X-, Y-, and Z-directions and the pan-, tilt-, and optical axis directions in the present embodiment is a mere example, and is not limitative. When the optical module 12 is at the reference position, X-direction, Y-direction, and Z-direction are orthogonal to one another. The point of intersection between X-axis, Y-axis, and Z-axis refers to a reference point C (FIG. 3) described later.

Optical Module

Figure 7:
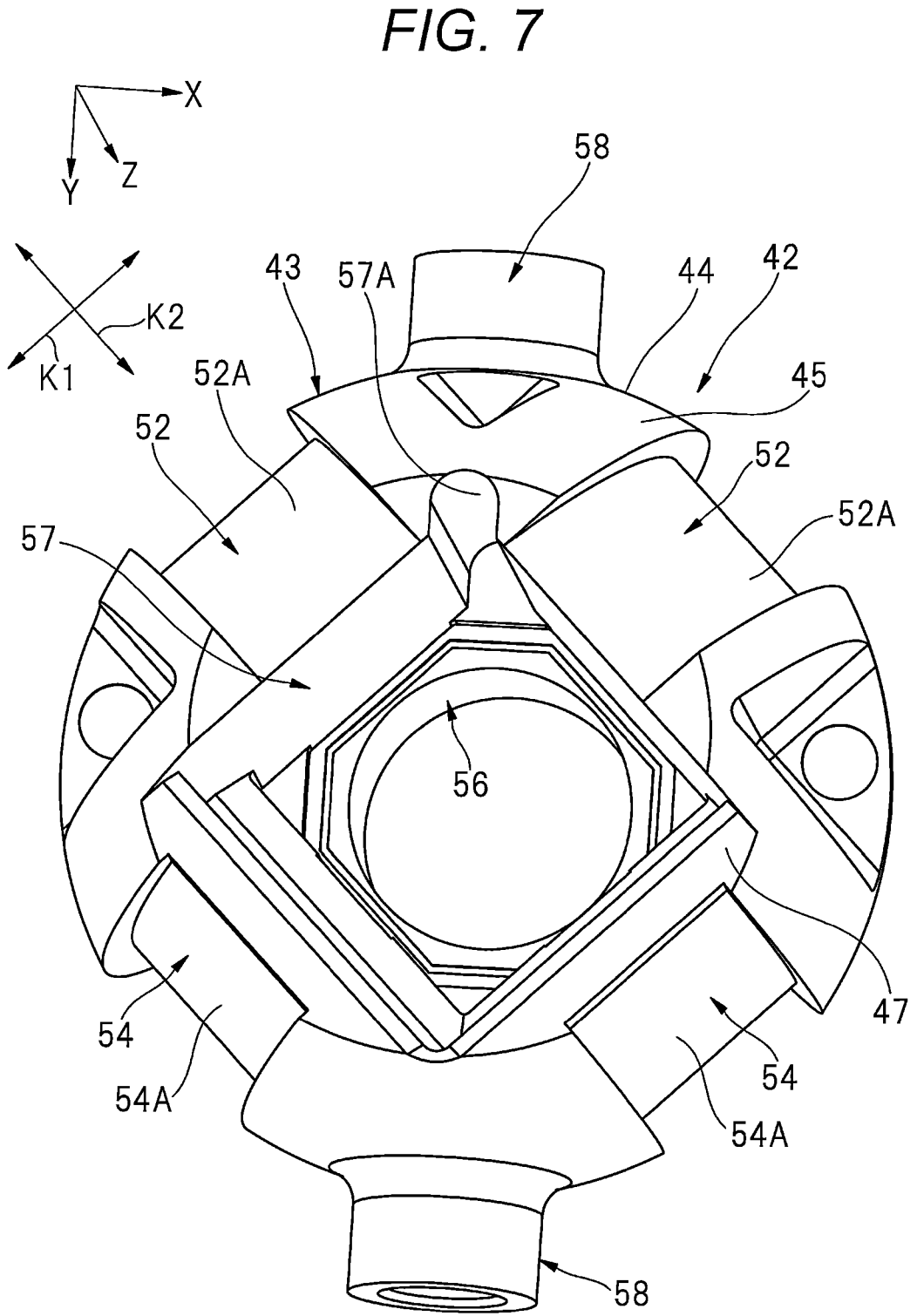
FIG. 7 is a perspective view of the holder shown in FIG. 6 as viewed from below.
Figure 8A:
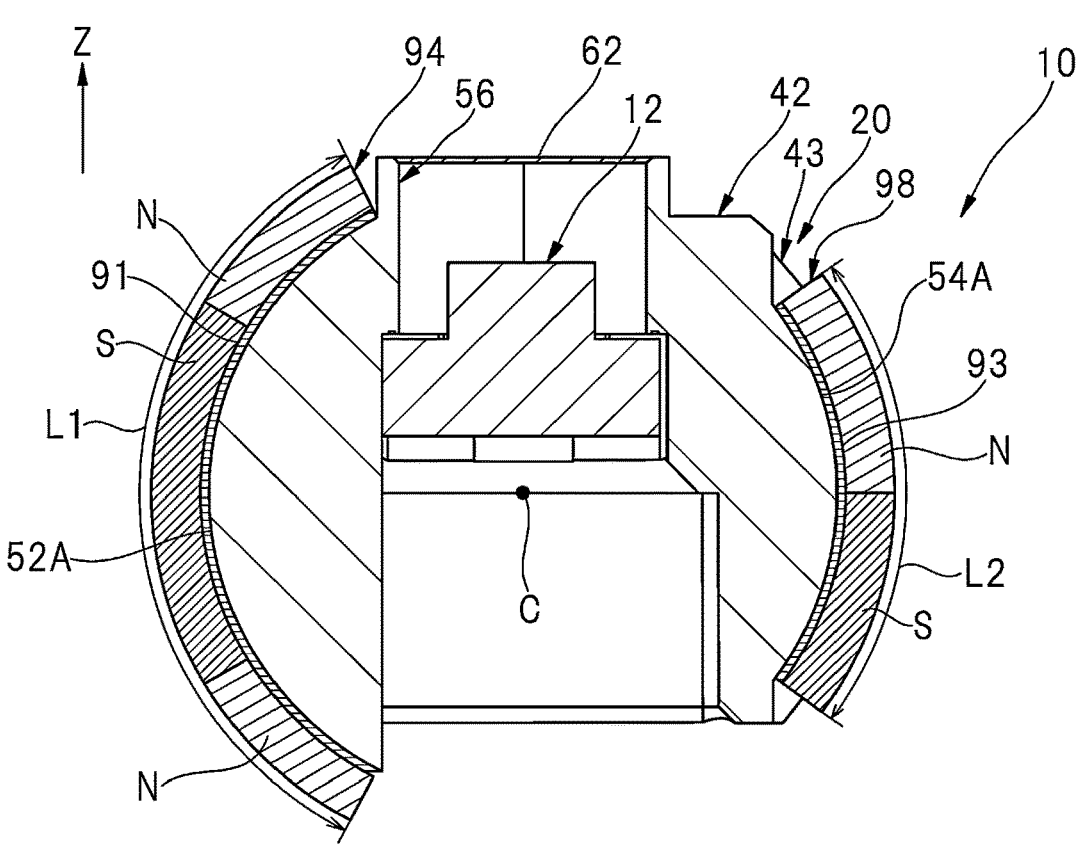
FIG. 8A is a cross-sectional view of the holder and an optical module shown in FIG. 1, taken along a plane including a reference point.
Figure 8B:
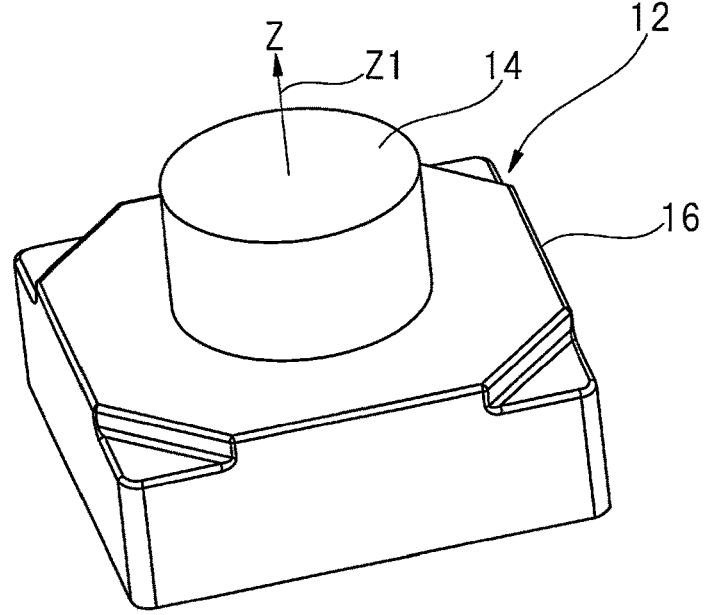
FIG. 8B is a perspective view of the optical module in FIG. 8A.

As shown in FIG. 8B, the optical module 12 includes a lens 14 as an optical element, and a body 16 including, for example, an image sensor (not shown) that captures a subject image formed through the lens 14. The optical module 12 has an optical axis Z1. The optical module 12 is an example of a drive target, which is driven rotationally by the actuator 20 (FIG. 1) described later. The optical module 12 is fixed to a housing 57 (FIG. 7) in a holder 42 described later.

Actuator

Figure 2:
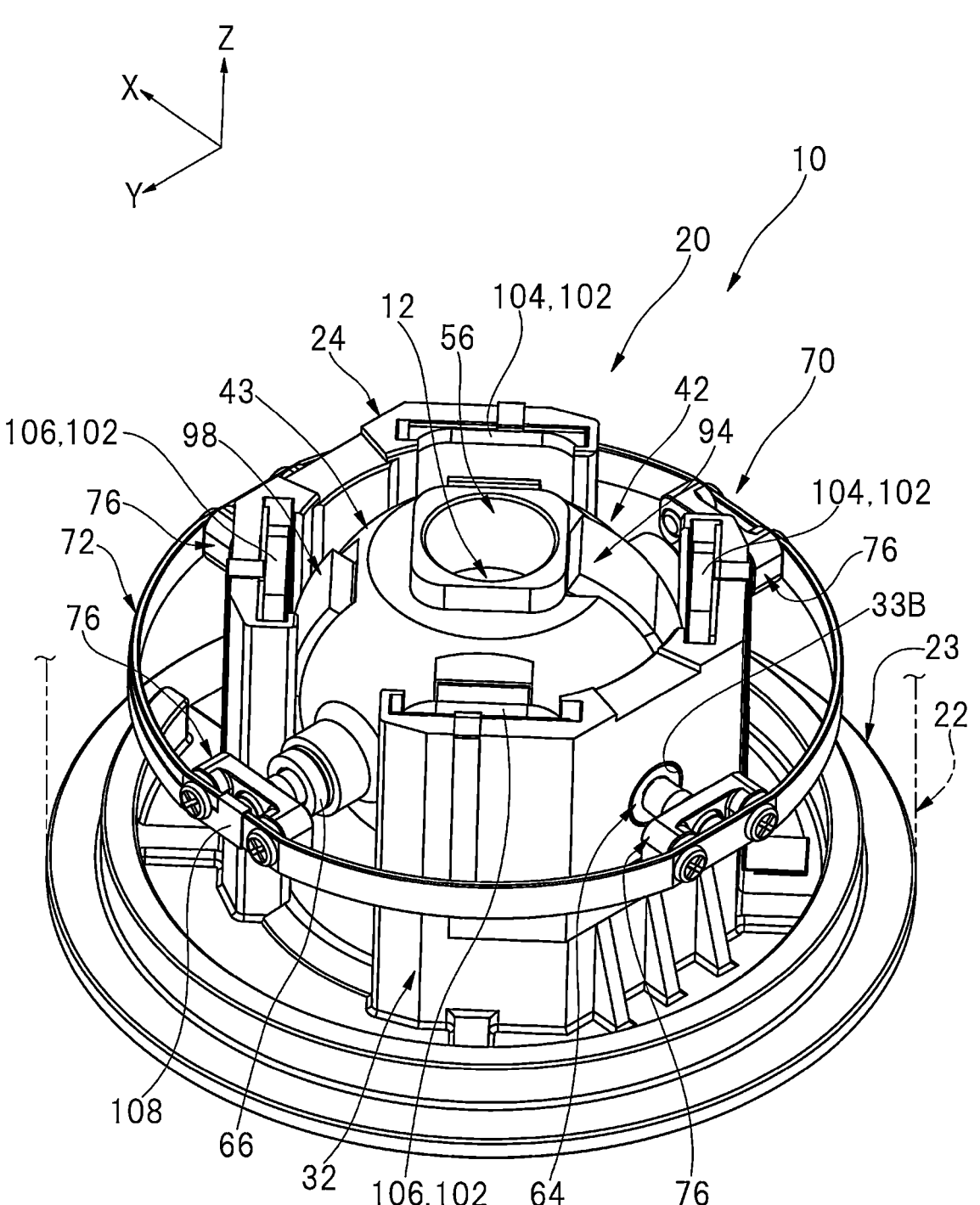
FIG. 2 is a perspective view of the optical device shown in FIG. 1, with a side wall of a case being removed.
Figure 3:
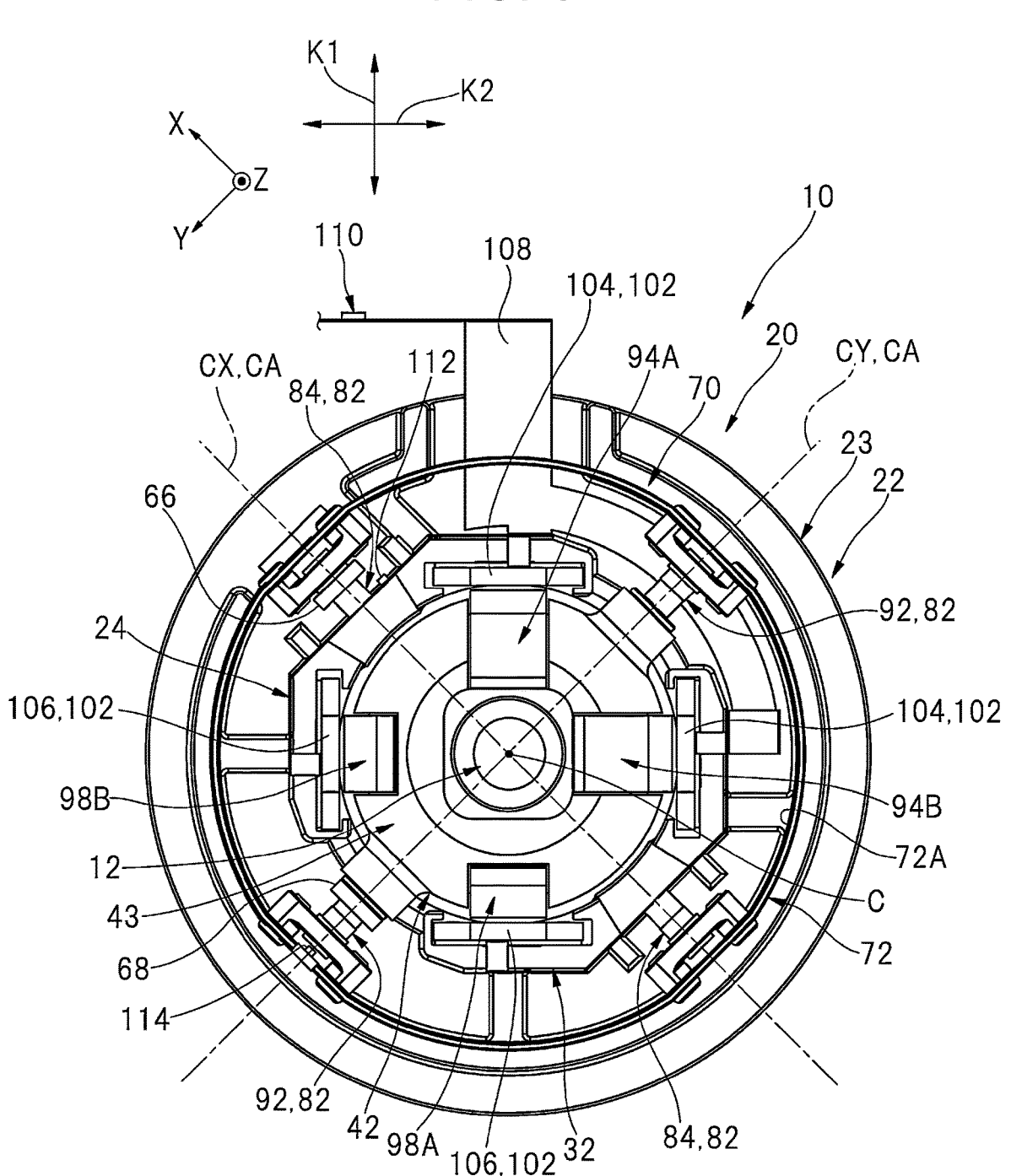
FIG. 3 is a plan view of the optical device shown in FIG. 2.

As shown in FIG. 1, the actuator 20 includes, for example, a case 22, a holder 42, a support assembly 70, a pair (two) of first magnets 94, a pair (two) of second magnets 98, and two pairs of coils 102 (FIG. 2). The actuator 20 includes flexible printed circuits (FPCs) 108, an integrated circuit (IC) 110 (FIG. 10), and a first sensor 112 and a second sensor 114 (FIG. 3).

Case

Figure 4:
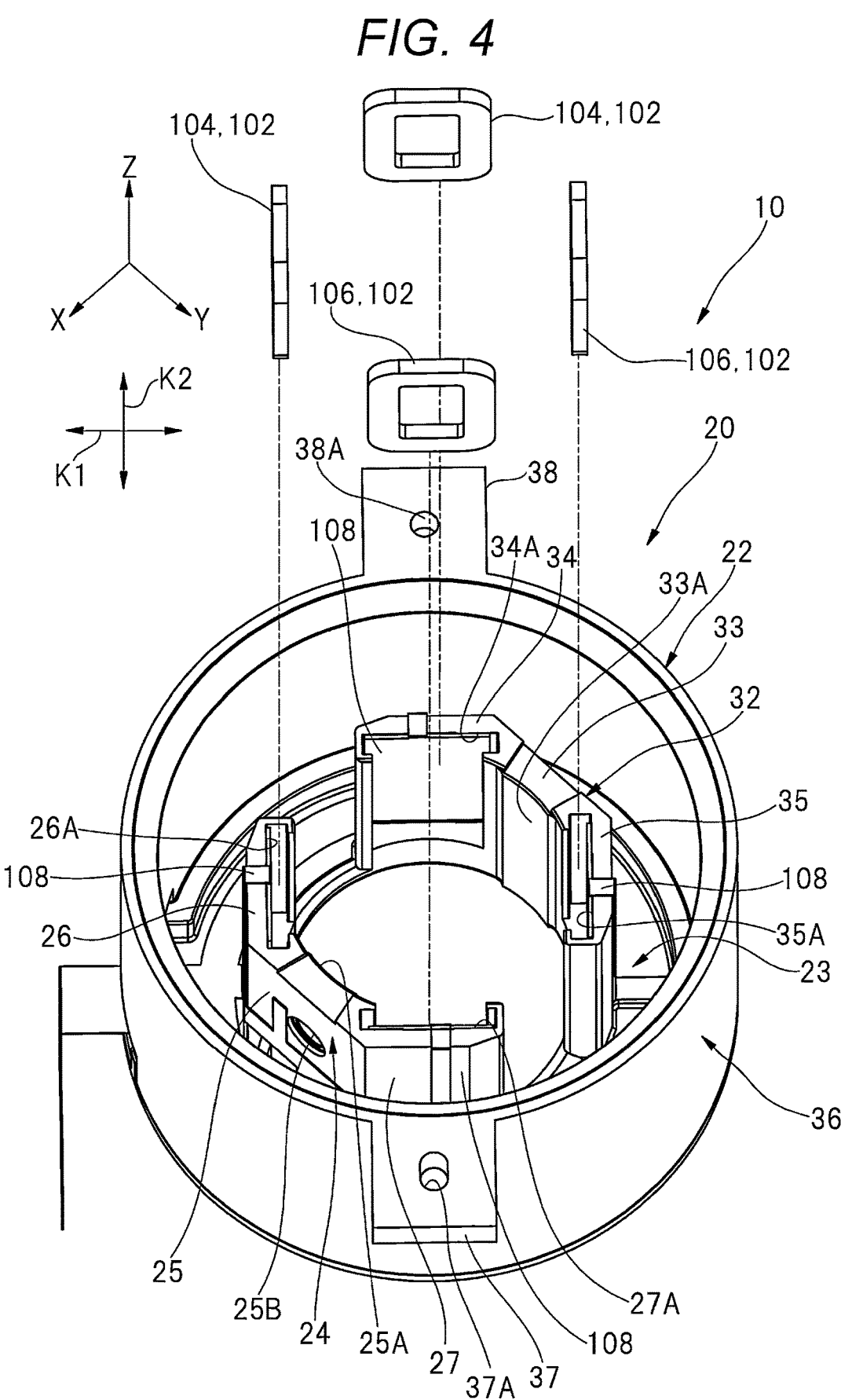
FIG. 4 is a perspective view of the case and coils included in the optical device shown in FIG. 1.

As shown in FIG. 4, the case 22 is a bottomed cylinder that opens in the positive Z-direction. The case 22 has an opening that allow the FPCs 108 to be routed. The case 22 houses the holder 42 (FIG. 2) described later. The case 22 has a bottom wall 23, support walls 24 and 32 facing each other in X-direction, a side wall 36, and fixtures 37 and 38. The bottom wall 23 is a disk having a predetermined thickness in Z-direction.

The support wall 24 stands upright in the positive Z-direction from a portion of the bottom wall 23 in the positive X-direction from the center of the circular bottom wall 23. The support wall 24 has a vertical wall 25, a vertical wall 26, and a vertical wall 27. The vertical wall 25 extends in Y-direction as viewed in Z-direction. The vertical wall 26 extends obliquely at 45° in the negative X-direction and the negative Y-direction from the end of the vertical wall 25 in the negative Y-direction. The vertical wall 27 extends obliquely at 45° in the negative X-direction and the positive Y-direction from the end of the vertical wall 25 in the positive Y-direction.

The vertical wall 25 has a curved surface 25A on its side in the negative X-direction. The vertical wall 25 has a recess 25B into which a bearing 64 (FIG. 5) described later is fitted on its side in the positive X-direction. The vertical wall 26 has a coil mount 26A that is open toward the holder 42. The vertical wall 27 has a coil mount 27A that is open toward the holder 42.

The support wall 32 stands upright in the positive Z-direction from a portion of the bottom wall 23 in the negative X-direction from the center of the circular bottom wall 23. The support wall 32 has a vertical wall 33, a vertical wall 34, and a vertical wall 35. The vertical wall 33 extends in Y-direction as viewed in Z-direction. The vertical wall 34 extends obliquely at 45° in the positive X-direction and the negative Y-direction from the end of the vertical wall 33 in the negative Y-direction. The vertical wall 35 extends obliquely at 45° in the positive X-direction and the positive Y-direction from the end of the vertical wall 34 in the positive Y-direction.

The vertical wall 33 has a curved surface 33A on its side in the positive X-direction. The vertical wall 33 has a recess 33B (FIG. 2) into which the bearing 64 (FIG. 5) described later is fitted on its side in the negative X-direction. The vertical wall 34 has a coil mount 34A that is open toward the holder 42. The vertical wall 35 has a coil mount 35A that is open toward the holder 42.

The side wall 36 is cylindrical and has Z-axis as its central axis. The fixtures 37 and 38 are spaced from each other in the circumferential direction of the side wall 36 on the end of the side wall 36 in the positive Z-direction. The fixtures 37 and 38 have through-holes 37A and 38A, through which screws (not shown) are peaceable. The fixtures 37 and 38 are fastened to a drive target (not shown) using screws.

Holder

Figure 6:
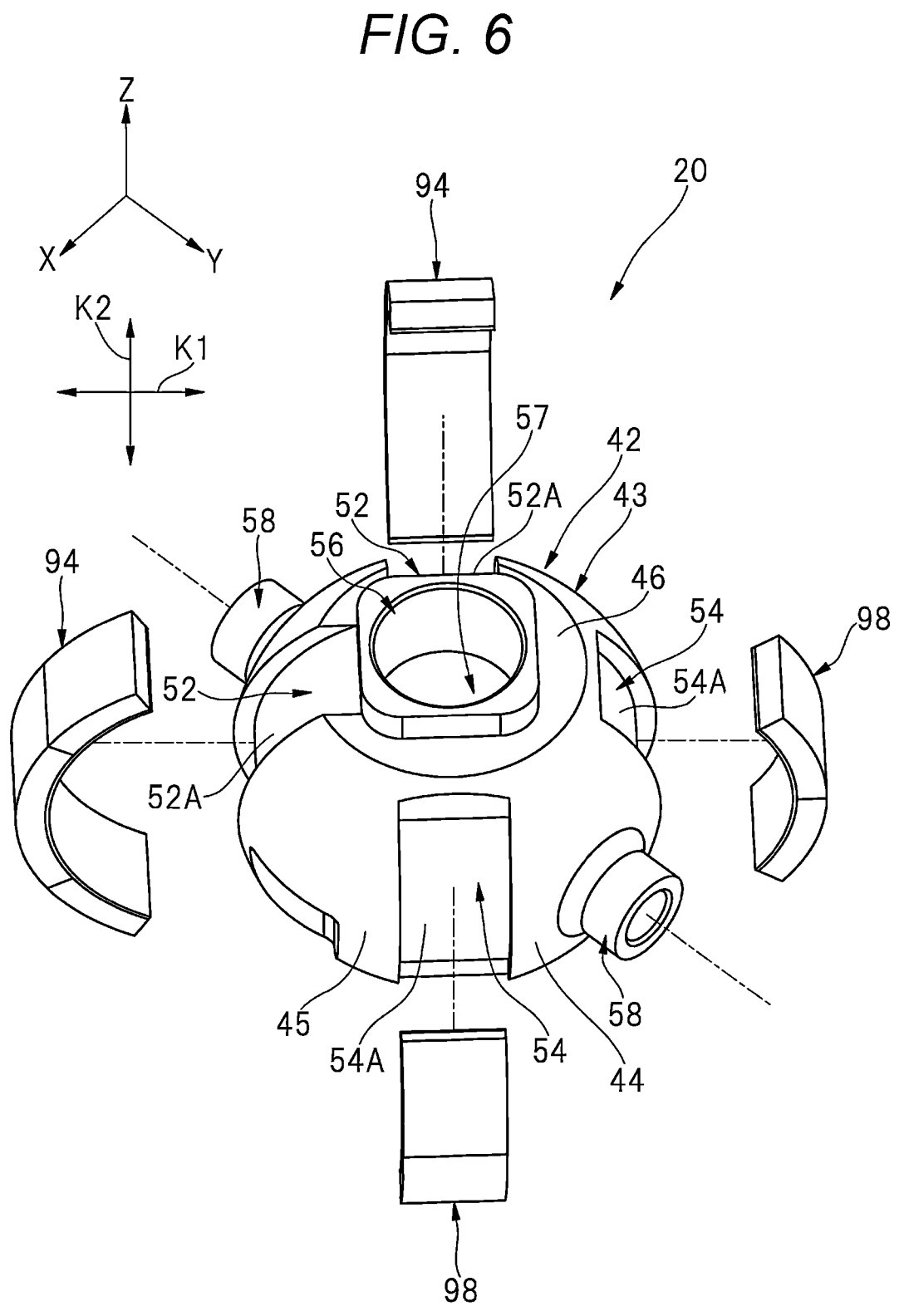

As shown in FIGS. 6 and 7, the holder 42 is substantially spherical. In the present embodiment, being spherical refers to a spherical portion that can include a non-spherical portion such as a flat portion or a curved portion. The holder 42 houses the optical module 12 (FIG. 1). The holder 42 includes a sphere 43, two first grooves 52, two second grooves 54, an opening 56, a housing 57 (FIG. 7), and two cylindrical portions 58.

As shown in FIG. 8A, the holder 42 includes, for example, a filter 62 (described later), two pairs of bearings 64 (FIG. 5), the first magnets 94, and the second magnets 98. In the figures except FIG. 8A, the filter 62 is not shown.

The sphere 43 is a portion with a spherical surface centered at the reference point C that is predetermined (preset). In the present embodiment, the sphere 43 includes a spherical surface, but may include portions other than the spherical surface. The reference point C is located at the center of an imaginary sphere including the spherical surface of the sphere 43. In the present embodiment, for example, the rotation center of the holder 42 is located at the reference point C. The reference point C and the rotation center of the holder 42 may be at different positions.

As shown in FIG. 6, the sphere 43 has an outer circumferential surface 44. The outer circumferential surface 44 includes an outer spherical surface 45, a flat surface 46, and a flat surface 47 (FIG. 7). The flat surface 46 is located at the end of the holder 42 in the positive Z-direction, and is a plane along an XY plane. The flat surface 47 is located at the end of the holder 42 in the negative Z-direction, and is a plane along an XY plane.

Of the two first grooves 52, one first groove 52 is recessed radially inward from a portion of the outer spherical surface 45 in the positive X-direction and the negative Y-direction toward the reference point C (FIG. 3) of the holder 42. The other first groove 52 is recessed radially inward from a portion of the outer spherical surface 45 in the negative X-direction and the negative Y-direction toward the reference point C of the holder 42. Each first groove 52 has a predetermined width in the direction of the angle of intersection of 45° with respect to each of X-direction and Y-direction. Each first groove 52 has a first curved surface 52A as a bottom surface. The first curved surface 52A is located on one end of the sphere 43 in the radial direction from the reference point C.

Of the two second grooves 54, one second groove 54 is recessed radially inward from a portion of the outer spherical surface 45 in the negative X-direction and the positive Y-direction toward the reference point C of the holder 42. The other second groove 54 is recessed radially inward from a portion of the outer spherical surface 45 in the positive X-direction and the positive Y-direction toward the reference point C of the holder 42. Each second groove 54 has a predetermined width in the direction of the angle of intersection of 45° with respect to each of X-direction and Y-direction. Each second groove 54 has a second curved surface 54A as a bottom surface. The second curved surface 54A is located on the other end of the sphere 43 in the radial direction from the reference point C.

Neither the first curved surface 52A nor the second curved surface 54A is spherical. The second curved surface 54A has a less meridian length than the first curved surface 52A.

The direction in which one first groove 52 and one second groove 54 are aligned is referred to as a K1 direction. The direction in which the other first groove 52 and the other second groove 54 are aligned is referred to as a K2 direction. The K1 direction and the K2 direction are orthogonal to each other. The K1 direction and the K2 direction intersect with X-direction and Y-direction in an XY plane at an angle of 45° with each of X-direction and Y-direction. The K1 direction and the K2 direction are examples of the radial direction. The X-direction and Y-direction are examples of the intersecting direction intersecting with the radial direction. The Z-direction is an example of the orthogonal direction orthogonal to both the radial direction and the intersecting direction.

The opening 56 is a cylindrical portion protruding from the flat surface 46 in the positive Z-direction. The opening 56 is open in Z-direction. The opening 56 is a cylindrical hole. The housing 57 defines a space in which the optical module 12 (FIG. 1) is housed. The housing 57 is rectangular as viewed in the negative Z-direction. The housing 57 has a groove 57A (FIG. 7) extending in Z-direction on one corner. The groove 57A is used as a flow channel for an adhesive when the optical module 12 is fixed to the housing 57.

Of the two cylindrical portions 58, one cylindrical portion 58 protrudes from the outer circumferential surface 44 in the negative Y-direction with respect to the reference point C (FIG. 3). The other cylindrical portion 58 protrudes from the outer circumferential surface 44 in the positive Y-direction with respect to the reference point C. The two cylindrical portions 58 are located on the same line. In other words, the two cylindrical portions 58 each have, for example, Y-axis as the central axis.

Filter

As shown in FIG. 8A, the filter 62 is received in the opening 56. The filter 62 selectively transmits light entering the opening 56 from outside. More specifically, the filter 62 cuts light in the visible light wavelength range by reflection or absorption. In the figures except FIG. 8A, the filter 62 is not shown.

Bearing

Figure 5:
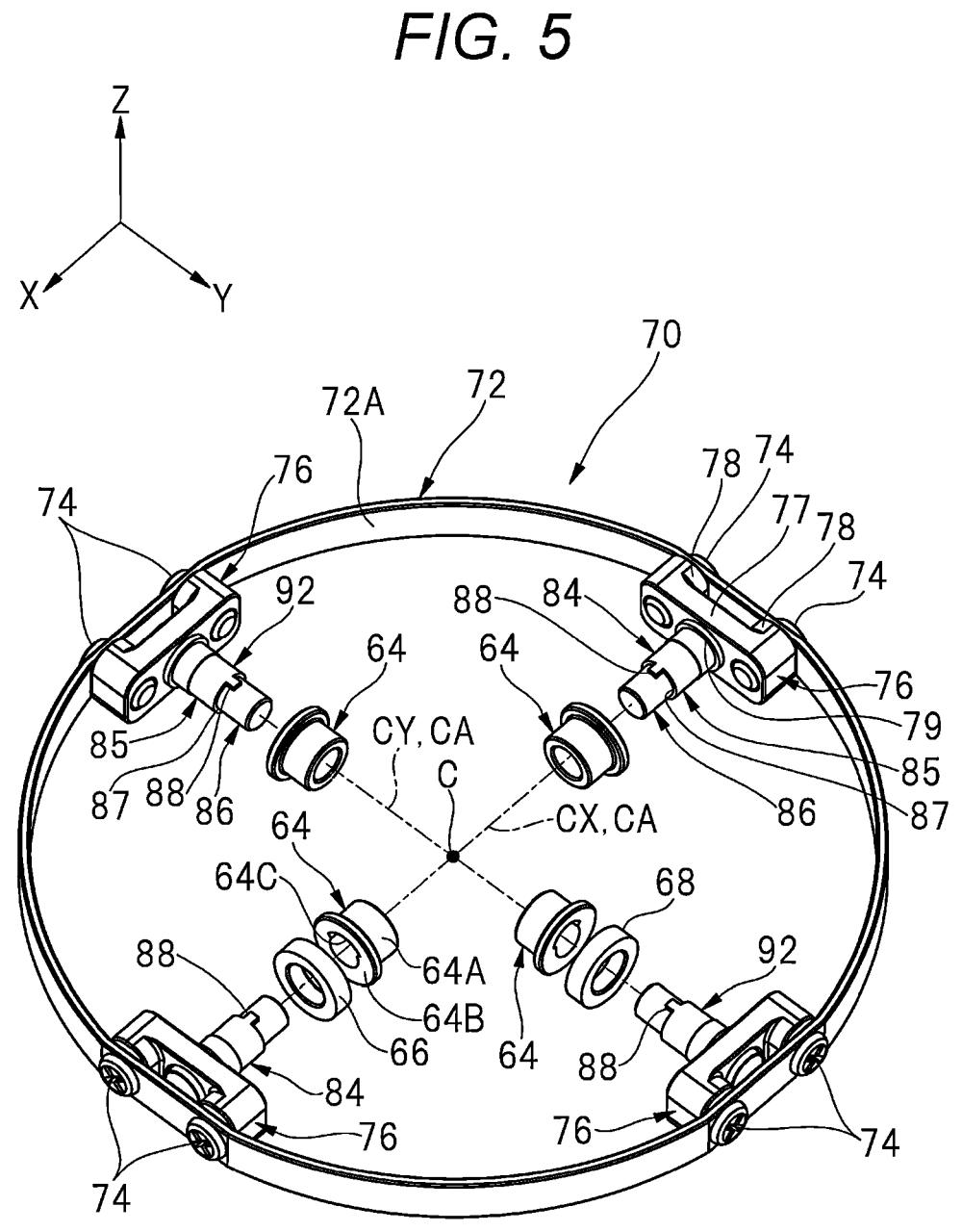

As shown in FIG. 5, four bearings 64 are arranged in pairs. One pair of bearings 64 face each other on Y-axis, and the other pair of bearings 64 face each other on X-axis. The bearings 64 each include a cylinder 64A, a flange 64B extending radially outward from the outer end of the cylinder 64A in the central axial direction, and an arc 64C on the flange 64B. The bearings 64 are, for example, non-magnetic. In the present embodiment, being non-magnetic refers to having a relative permeability less than 1.5. Being ferromagnetic refers to having a relative permeability greater than or equal to 1.5.

The arc 64C is, for example, a cutout in a range of 40° on one end and 40° on the other end in the circumferential direction with respect to Z-axis (not shown). The arc 64C limits the rotation range of the holder 42 (FIG. 2) to a total of 80° when coming in contact with protrusions 88 on a first shaft 84 and a second shaft 92 (described later). The angle limiting structures each combining the arc 64C and the protrusion 88 may not be two pairs for each axis, but may be one pair for each axis.

The pair of bearings 64 on X-axis are fitted in the recess 25B (FIG. 4) and the recess 33B (FIG. 2) on the case 22. The pair of bearings 64 on X-axis receive a pair of first shafts 84 (described later). The pair of first shafts 84 are slidable relative to the two bearings 64.

The other pair of bearings 64 on Y-axis are fitted on a pair of cylindrical portions 58 (FIG. 6) of the holder 42 from outside. The pair of bearings 64 on Y-axis receive a pair of second shafts 92 (described later). The pair of second shafts 92 are slidable relative to the two bearings 64.

First Magnetic Member

A first magnetic member 66 is annular. The first magnetic member 66 is located on the first shaft 84 in the positive X-direction. More specifically, the first magnetic member 66 is fixed to the first shaft 84. The first magnetic member 66 is adjacent in X-direction to the bearing 64. The first magnetic member 66 is an example of a first magnetic member with a direction of a magnetic force changeable as the first shaft 84 rotates. The first magnetic member 66 is detected by the first sensor 112 (FIG. 3) described later.

Second Magnetic Member

A second magnetic member 68 is annular. The second magnetic member 68 is adjacent in Y-direction to the bearing 64 located in the positive Y-direction. The second magnetic member 68 is integral with the bearing 64 located in the positive Y-direction and the holder 42 (FIG. 3). The second magnetic member 68 is an example of a second magnetic member with a direction of a magnetic force changeable as the second shaft 92 rotates. The second magnetic member 68 is detected by the second sensor 114 (FIG. 3) described later.

Support Assembly

As shown in FIG. 3, the support assembly 70 is located inside the case 22. The support assembly 70 supports the holder 42 in a manner rotatable about the reference point C. A line including the reference point C and extending in the intersecting direction intersecting with the radial direction (K1 or K2 direction) of the holder 42 is referred to as a rotation axis CA. The support assembly 70 includes, for example, a frame 72, four bases 76, eight eccentric screws 74, and rotational shafts 82. In the present embodiment, the rotation axis CA includes a first rotation axis CX and a second rotation axis CY that are orthogonal to each other. The first rotation axis CX extends in X-direction. The second rotation axis CY extends in Y-direction.

Frame

As shown in FIG. 5, the frame 72 is a circular (annular) member centered on the reference point C as viewed in Z-direction. The frame 72 has eight through-holes (not shown) extending in the radial direction at intervals in the circumferential direction of the frame 72. The eight through-holes each receive an eccentric screw 74. The frame 72 has a radially inner surface referred to as an inner circumferential surface 72A.

Base

The bases 76 are at equal intervals at four positions in the circumferential direction of the frame 72. The four bases 76 have the same structure except for their positions. A single base 76 will be described in detail, and the other three bases will not be described. The base 76 includes a flat plate 77 having a predetermined thickness in the radial direction of the frame 72 and two legs 78 protruding from the flat plate 77 toward the inner circumferential surface 72A.

The flat plate 77 has substantially the same height as the frame 72 in Z-direction. The two legs 78 are spaced from each other in the circumferential direction of the frame 72. A fixture 79, to which a basal portion 85 of the corresponding rotational shaft 82 is fixed, is located at the middle of the flat plate 77. Although the frame 72 is circular, the frame 72 includes flat portions with the bases 76, thus allowing the rotational shafts 82 to be easily supported by the circular frame 72.

Eccentric Screw

The eight eccentric screws 74 are placed in pairs for each base 76. The eight (four pairs) eccentric screws 74 are examples of an adjuster that can adjust the positions of the four bases 76 relative to the frame 72. In other words, the position of each of the four bases 76 is adjustable in Z-direction and in the circumferential direction of the frame 72 when the base 76 is fastened to the frame 72 with the corresponding pair of eccentric screws 74. The adjuster may not include eight eccentric screws 74. Another example adjuster may include four eccentric screws 74 and four regular screws. In some embodiments, the adjuster may include two eccentric screws 74 located on each end of the rotational shaft and six regular screws.

Rotational Shaft

Each rotational shaft 82 is located on the frame 72 in a manner rotatable about the corresponding rotation axis CA. More specifically, the rotational shafts 82 include the pair (two) of first shafts 84 rotatable about the first rotation axis CX, and the pair (two) of second shafts 92 that support the holder 42 (FIG. 3) in a manner rotatable about the second rotation axis CY. As described above, the support assembly 70 includes the frame 72, the pair of first shafts 84, and the pair of second shafts 92. The pair of first shafts 84 and the pair of second shafts 92 are located on the four bases 76.

The second shafts 92 are non-magnetic. Being non-magnetic is defined as described above. In the present embodiment, the first shafts 84 and the second shafts 92 have the same structure except for the positions and their fixed state. The first shafts 84 will be described in detail, without the second shafts 92 being described when the same reference numerals as those of the first shafts 84 are used.

The first shafts 84 each include the basal portion 85 that is cylindrical and fixed to the fixture 79 and a smaller-diameter portion 86 located radially inward from the basal portion 85. The smaller-diameter portion 86 is a cylindrical portion with a smaller outer diameter than the basal portion 85. The basal portion 85 and the smaller-diameter portion 86 have the same first rotation axis CX. A step 87 is at the boundary between the basal portion 85 and the smaller-diameter portion 86. The step 87 includes a circumferential portion with the protrusion 88 protruding radially inward.

As shown in FIG. 3, the pair of first shafts 84 are supported by the support walls 24 and 32 of the case 22 in a rotatable manner. The pair of second shafts 92 support the holder 42 in a rotatable manner. In other words, the pair of first shafts 84 are rotatable, whereas the pair of second shafts 92 are non-rotatable. This allows the holder 42 to rotate about the first rotation axis CX and about the second rotation axis CY. The position of the holder 42 at which the X, Y, and Z-directions are orthogonal to one another is referred to as a reference position of the optical module 12 and the holder 42. The rotation angle of the holder 42 at the reference position is defined as 0°.

As shown in FIG. 8A, a first yoke 91 is fixed to the first curved surface 52A of the sphere 43. The first yoke 91 is a magnetic plate curved in conformance with the shape of the first curved surface 52A.

First Magnet

Each first magnet 94 is fixed to the corresponding first yoke 91 to cover the first yoke 91. In other words, the first magnet 94 is located on one end in the radial direction from the reference point C. The first magnet 94 has two N poles and one S pole between the two N poles. The two N poles and one S pole of the first magnet 94 are aligned in Z-direction. More specifically, the first magnet 94 has the N pole, the S pole, and the N pole aligned in this order from its end in the negative Z-direction to its end in the positive Z-direction. When the first magnet 94 is viewed as an arc, the circumferential length of one S pole of the first magnet 94 is greater than the circumferential length of one N pole of the first magnet 94. The first magnet 94 has a first length L1 (mm) as its arc length of the radially outermost surface along the sphere 43.

A second yoke 93 is fixed to the second curved surface 54A of the sphere 43. The second yoke 93 is a magnetic plate curved in conformance with the shape of the second curved surface 54A.

Second Magnet

Each second magnet 98 is fixed to the corresponding second yoke 93 to cover the second yoke 93 from outside. In other words, the second magnet 98 is located on the other end in the radial direction from the reference point C. The second magnet 98 has one N pole and one S pole. One N pole and one S pole of the second magnet 98 are aligned in Z-direction. More specifically, the second magnet 98 has the S pole and the N pole aligned in this order from its end in the negative Z-direction to its end in the positive Z-direction. The second magnet 98 has a second length L2 (mm) as its arc length of the radially outermost surface along the sphere 43.

The first length L1 is greater than the second length L2. The arc length of one N pole of the first magnet 94 is less than the arc length of one N pole of the second magnet 98. The arc length of one S pole of the first magnet 94 is greater than the arc length of one S pole of the second magnet 98. Thus, the first magnet 94 and the second magnet 98 are located asymmetric to each other with respect to the reference point C and have different lengths in the circumferential direction of the holder 42.

When one first magnet 94 and one second magnet 98 are paired, and two pairs of magnets are distinguished from each other, these magnets are distinguished as first magnets 94A and 94B, and as second magnets 98A and 98B.

Coil

As shown in FIG. 3, the actuator 20 includes two pairs of coils 102. The two pairs of coils 102 each include one first coil 104 and one second coil 106. The two pairs of coils 102 are received in the case 22 to generate a magnetic field that acts on the two pairs of magnets (first magnets 94A and 94B, and second magnets 98A and 98B) when energized.

As shown in FIG. 4, the first coils 104 are fixed to the coil mount 26A and the coil mount 34A. The second coils 106 are fixed to the coil mount 27A and the coil mount 35A. One pair of coils 102 are aligned in the K1 direction. The other pair of coils 102 are aligned in the K2 direction.

Figure 9:
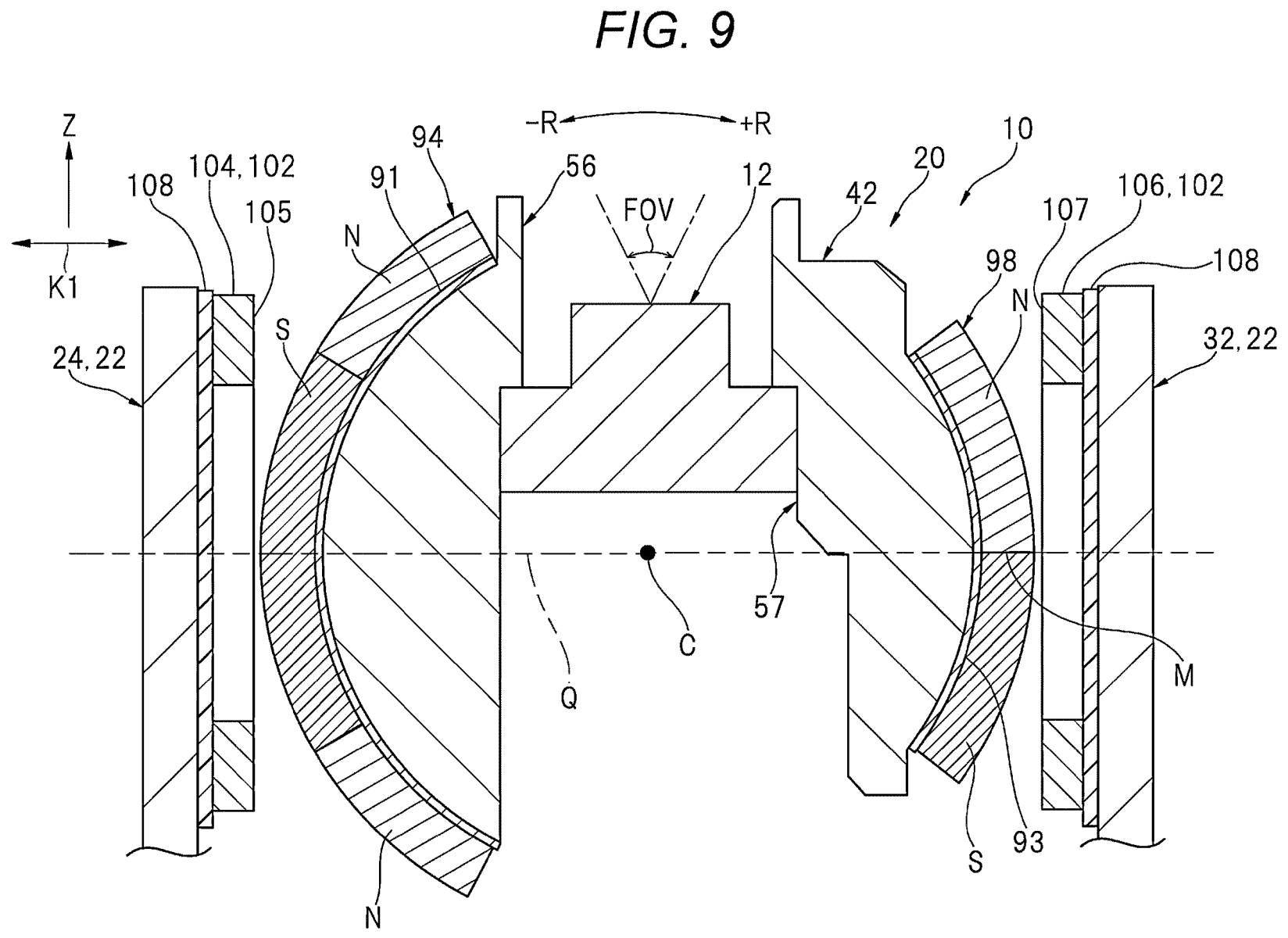

As shown in FIG. 9, the holder 42 is at the reference position in the rotation direction about the reference point C. For the rotation direction of the holder 42, the illustrated clockwise rotation is referred to as the positive R rotation, and the illustrated counterclockwise rotation is referred to as the negative R rotation.

The first coil 104 faces the first magnet 94 in the K1 direction. The first coil 104 has a facing surface 105 that faces the first magnet 94. The facing surface 105 extends in Z-direction. The first magnet 94 has its end in the positive Z-direction located farther in the positive Z-direction than the end of the first coil 104 in the positive Z-direction. The first magnet 94 has its end in the negative Z-direction located farther in the negative Z-direction the end of the first coil 104 in the negative Z-direction. In other words, the first magnet 94 extends beyond the range facing the first coil 104 in the circumferential direction.

The second coil 106 faces the second magnet 98 in the K1 direction. The second coil 106 has a facing surface 107 that faces the second magnet 98. The facing surface 107 extends in Z-direction. The second magnet 98 has its end in the positive Z-direction located farther in the negative Z-direction than the end of the second coil 106 in the positive Z-direction. The second magnet 98 has its end in the negative Z-direction located farther in the positive Z-direction than the end of the second coil 106 in the negative Z-direction. In other words, the second magnet 98 is within the range facing the second coil 106.

An imaginary line including the reference point C and extending in the K1 direction is referred to as a reference line Q. The first magnet 94 has one S pole located on the reference line Q. In other words, one S pole of the first magnet 94 extends in the negative Z-direction and the positive Z-direction across the reference line Q in the circumferential direction. The second magnet 98 has, for example, a boundary surface M (polarizing surface) between the N and S poles on the reference line Q. The components are arranged in the K2 direction in the same manner as in the K1 direction. Thus, the components in the K2 direction will not be described.

The optical module 12 has a field of view (FOV) of, for example, about 45°. The optical module 12 is fixed to a portion of the housing 57 in the positive Z-direction from the reference line Q. The FOV can thus be set to a larger value than when the optical module 12 is located at the reference point C.

Flexible Printed Circuit (FPC)

As shown in FIG. 3, each FPC 108 is an example of wiring electrically connected to the second sensor 114. The FPC 108 is placed from outside the case 22 into the case 22 and extends along the bottom wall 23. The driver IC 110 (FIG. 10) described later is mounted on and connected to a part of the FPC 108. The FPC 108 branches on the bottom wall 23 and is electrically connected to the two pairs of coils 102, the first sensor 112, and the second sensor 114. The first sensor 112 and the second sensor 114 are exaggerated in FIG. 3 from the actual sizes for clarity.

A part of the FPC 108 connected to the second sensor 114 is located along the frame 72. More specifically, the FPC 108 extends through the frame 72 toward a relay position radially aligned with the first shafts 84 on the frame 72, and further extends from the relay position toward the case 22 (bottom wall 23).

First Sensor

The first sensor 112 is a tunnel magneto resistance (TMR) sensor. The first sensor 112 is located on the support wall 24. The first sensor 112 detects the rotational positions of the first shafts 84 about the first rotation axis CX by detecting the direction of the magnetic force of the first magnetic member 66. The minimum distance between the first sensor 112 and the first magnetic member 66 is less than the minimum distance between the first sensor 112 and the first magnet 94A and less than the minimum distance between the first sensor 112 and the second magnet 98B.

Second Sensor

The second sensor 114 is a TMR sensor. The second sensor 114 is located on the frame 72. The second sensor 114 detects the rotational positions of the second shafts 92 about the second rotation axis CY by detecting the direction of the magnetic force of the second magnetic member 68. The minimum distance between the second sensor 114 and the second magnetic member 68 is less than the minimum distance between the second sensor 114 and the second magnet 98A and less than the minimum distance between the second sensor 114 and the second magnet 98B.

Driver IC

As shown in FIGS. 3 and 10, the driver IC 110 drives a pan unit U1 and a tilt unit U2 to rotate the holder 42 about the first rotation axis CX and the second rotation axis CY. The pan unit U1 includes a first coil 104A, a second coil 106A, and the first sensor 112. The tilt unit U2 includes a first coil 104B, a second coil 106B, and the second sensor 114.

As shown in FIG. 10, the driver IC 110 is electrically connected to a main board 200 with a connector 111. The main board 200 includes a central processing unit (CPU) and a memory 204. The main board 200 includes an input unit (not shown). The main board 200 may be a part of the optical device 10, or may be an external device different from the optical device 10.

Rotation of Holder

Figure 11A:
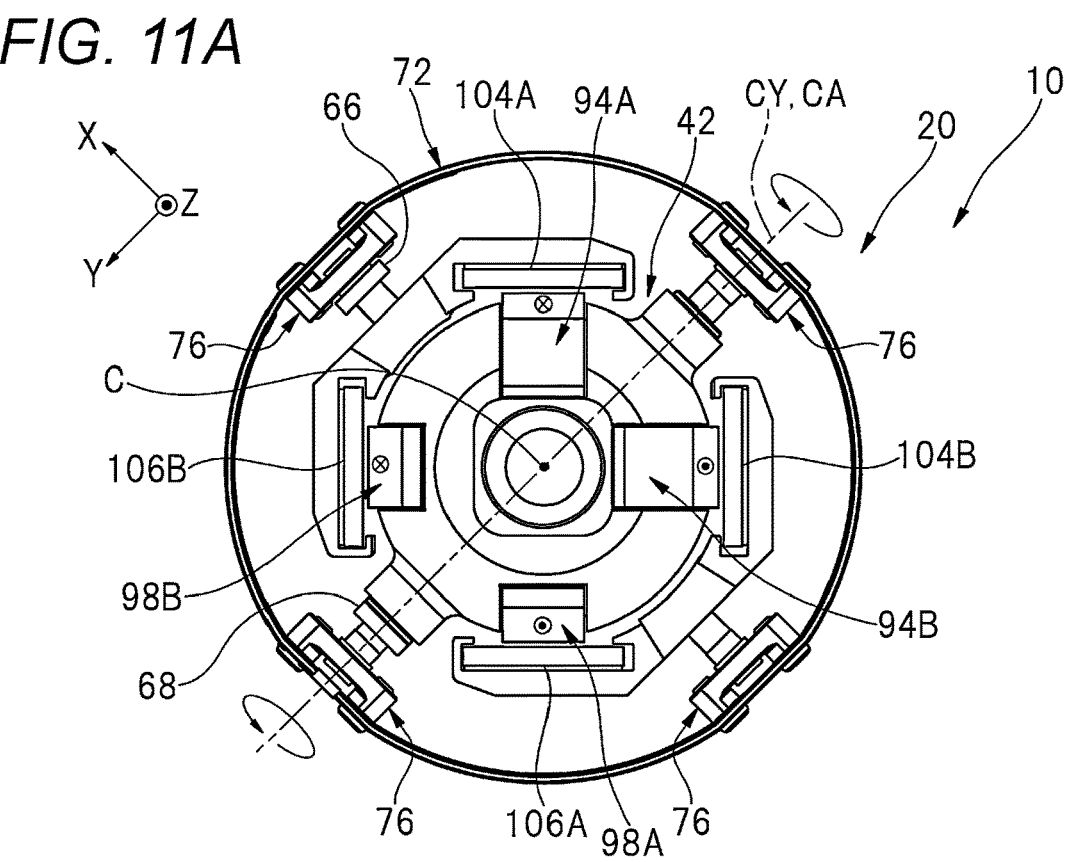
FIG. 11A is a plan view of the holder shown in FIG. 3 being rotated about a first rotation axis.
Figure 11B:
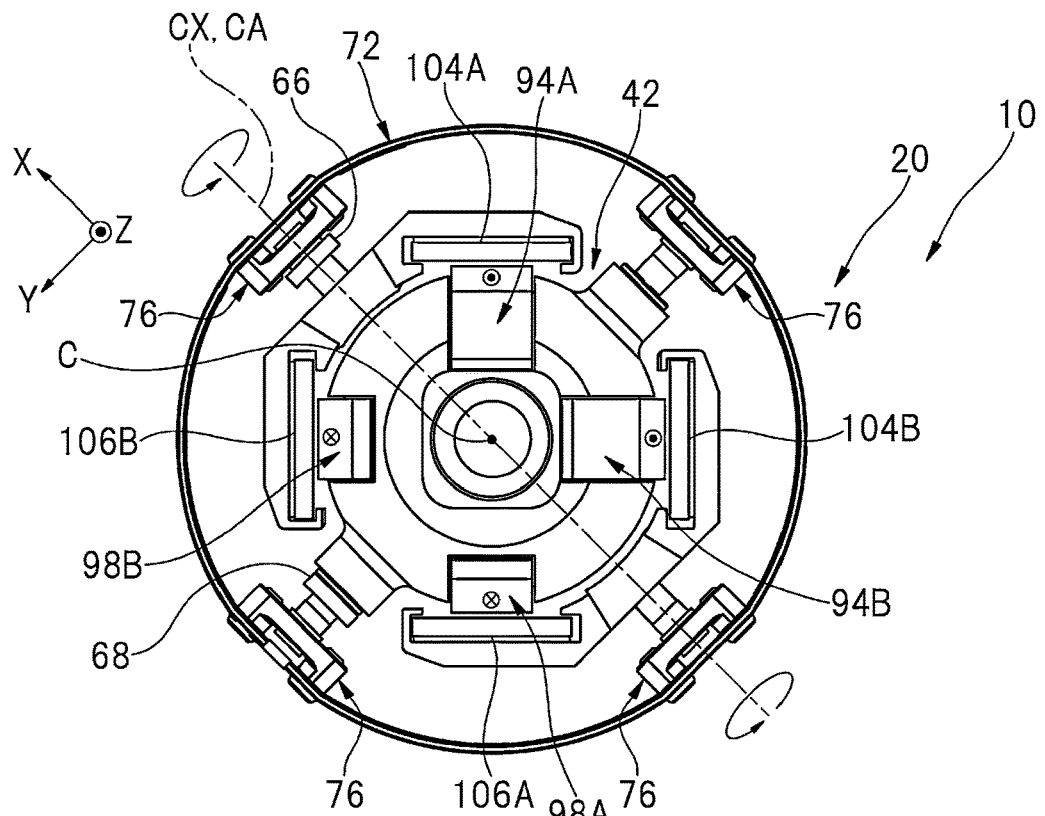
FIG. 11B is a plan view of the holder shown in FIG. 3 being rotated about a second rotation axis.

FIGS. 11A and 11B show the holder 42 that starts rotating when the first coils 104A and 104B and the second coils 106A and 106B are energized. For the thrust (drive torque) acting on the first magnets 94 and the second magnets 98, X marks in the figure indicate the thrust acting in the negative Z-direction. Black circles in the figure indicate the thrust acting in the positive Z-direction.

As shown in FIG. 11A, when the first magnet 94A and the second magnet 98B receive thrust in the negative Z-direction and the first magnet 94B and the second magnet 98A receive thrust in the positive Z-direction, the holder 42 rotates (in one direction) about the second rotation axis CY. When the thrust acts in the opposite direction, the holder 42 rotates about the second rotation axis CY (in the other direction).

As shown in FIG. 11B, when the first magnets 94A and 94B receive thrust in the positive Z-direction and the second magnets 98A and 98B receive thrust in the negative Z-direction, the holder 42 rotates (in one direction) about the first rotation axis CX. When the thrust acts in the opposite direction, the holder 42 rotates about the first rotation axis CX (in the other direction).

Effects of Components in First Embodiment

Figure 12A:
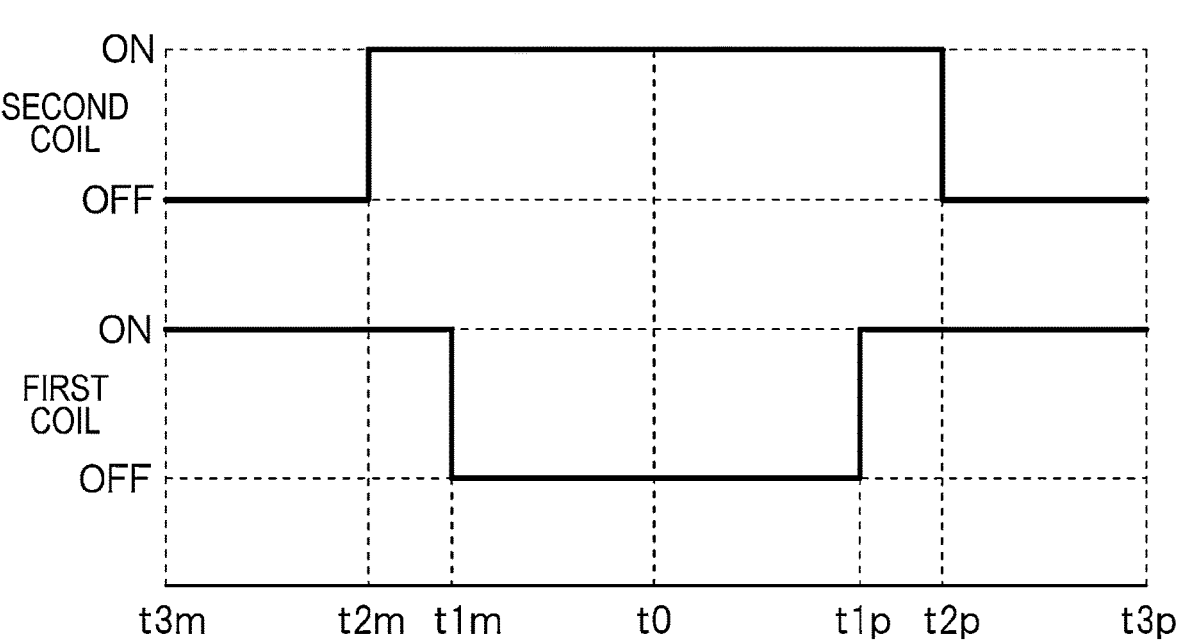
FIG. 12A is a timing chart showing the on-off state of a first coil and a second coil.

FIG. 12A is a timing chart showing the on-off state for energizing the first coil 104 and the second coil 106 (FIG. 3). The holder 42 is at the reference position (angle of) 0° at a time point to. Time points t1m, t2m, and t3m indicate time points at which the holder 42 rotates from the time point to in the negative direction (toward the first coil 104). Time points t1p, t2p, and t3p indicate time points at which the holder 42 rotates from the time point to in the positive direction (toward the second coil 106).

The first coil 104 is off at the time point to, changes from off to on at the time point t1m, and is on at the time points t2m and t3m. Similarly, the first coil 104 changes from off to on at the time point t1p, and is on at the time points t2p and t3p.

The second coil 106 is on at the time points to and t1m, changes from on to off at the time point t2m, and is off at the time point t3m. Similarly, the second coil 106 is on at the time point t1p, changes from on to off at the time point t2p, and is off at the time point t3p.

Figure 12B:
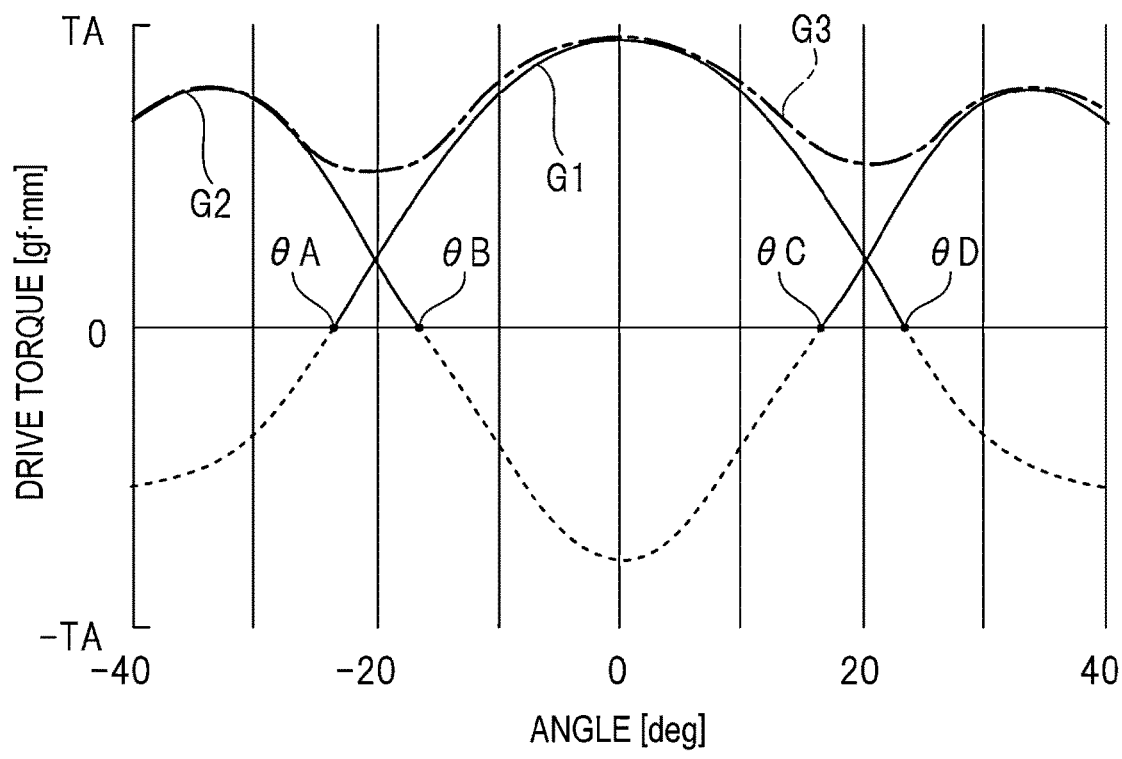
FIG. 12B is a graph showing the drive torque generated from each of the first coil and the second coil and their total torque.

FIG. 12B shows the relationship between the rotation angle (°) of the holder 42 (FIG. 2) from the reference position and the drive torque acting on the holder 42 as lines G1, G2, and G3. The line G1 shows the drive torque acting on the second magnet 98. The line G2 shows the drive torque acting on the first magnets 94. The line G3 shows a sum (total torque) of the drive torque acting on the first magnets 94 and the second magnets 98. The G3 is slightly shifted from the lines G1 and G2 for clarity. In each of the lines G1 and G2, the dotted line indicates that the drive torque is zero in a non-energized state.

In FIGS. 12A and 12B, θA is the angle at the time point t2m, θB is the angle at the time point t1m, θC is the angle at the time point t1p, and OD is the angle at the time point t2p. At the time point to, the holder 42 is at the reference position, and thus the angle is 0°.

Figure 13A:
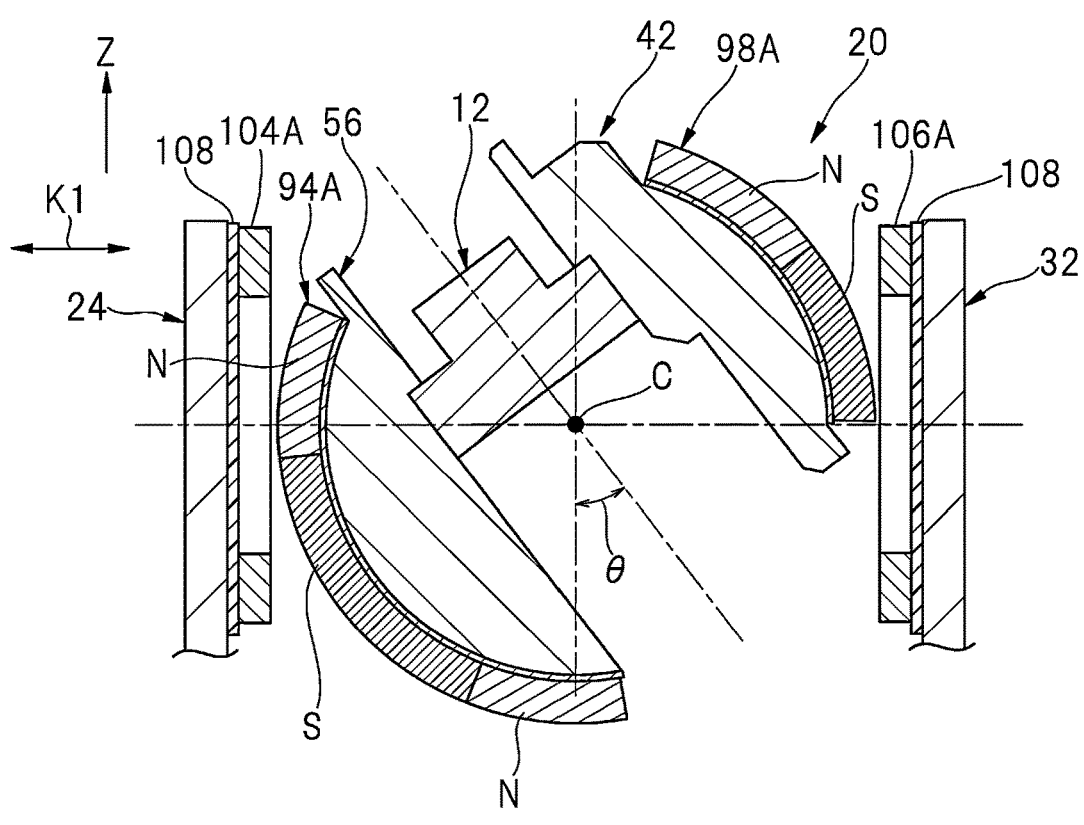
FIG. 13A is a cross-sectional view of the holder and the optical module shown in FIG. 11 being rotated toward the second coil.

With reference to FIGS. 12A, 12B, and 13A, rotation of the holder 42 toward the first coil 104A (in the negative direction) will be described. During rotation of the holder 42, the drive torque acting on the second magnet 98A is the main torque when the drive starts. The drive torque acting on the first magnet 94A then serves as the support torque after the drive starts.

The magnetic force between the second coil 106A and the second magnet 98A causes the holder 42 to rotate from the reference position in the negative direction. As the rotation angle of the holder 42 increases in the negative direction, the drive torque resulting from the energized second coil 106A decreases. The first coil 104A starts being energized at the time point t1m, and the drive torque is applied to the holder 42 under the magnetic force acting between the first coil 104A and the first magnet 94A. This increases the total torque indicated by the line G3 compared with the single drive torque indicated by the line G1, thus reducing a decrease in the drive torque acting on the holder 42.

Figure 13B:
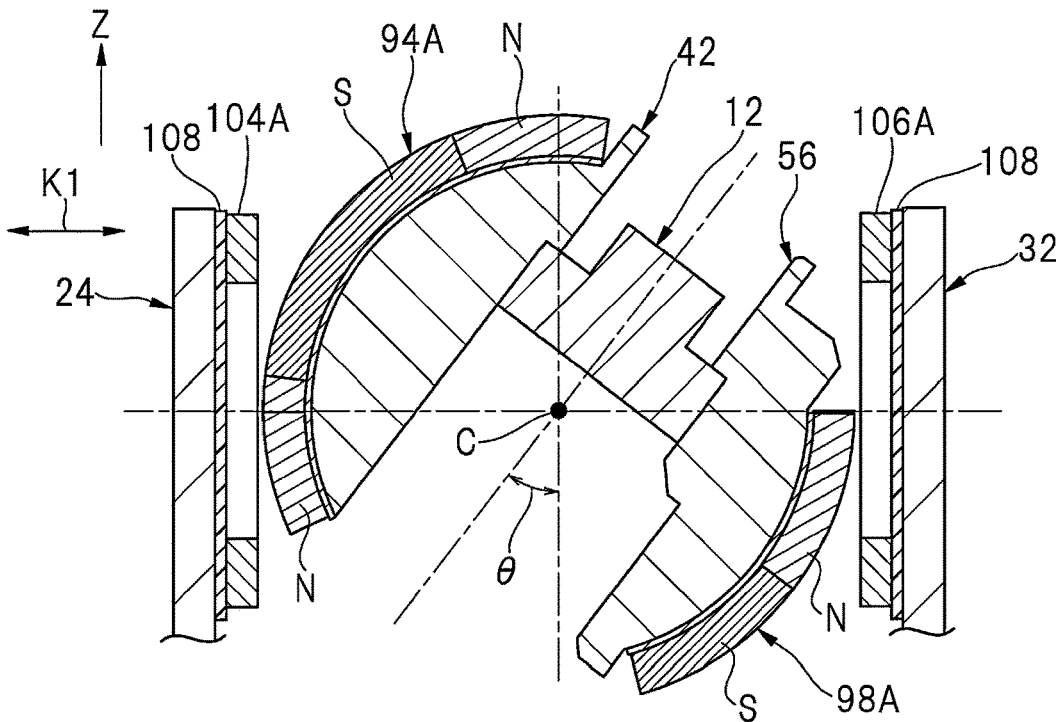
FIG. 13B is a cross-sectional view of the holder and the optical module shown in FIG. 11 being rotated toward the first coil.

With reference to FIGS. 12A, 12B, and 13B, rotation of the holder 42 toward the second coil 106A (in the positive direction) will be described. The rotation of the holder 42 in the positive direction is performed by reversing the direction of the current flowing through each coil from the direction when the holder 42 is rotated in the negative direction.

The magnetic force between the second coil 106A and the second magnet 98A causes the holder 42 to rotate from the reference position in the positive direction. As the rotation angle of the holder 42 increases in the positive direction, the drive torque resulting from the energized second coil 106A decreases. The first coil 104A starts being energized at the time point t1p, and the drive torque is applied to the holder 42 under the magnetic force acting between the first coil 104A and the first magnet 94A. This increases the total torque indicated by the line G3 compared with the single drive torque indicated by the line G1, thus reducing a decrease in the drive torque acting on the holder 42.

Figure 14:
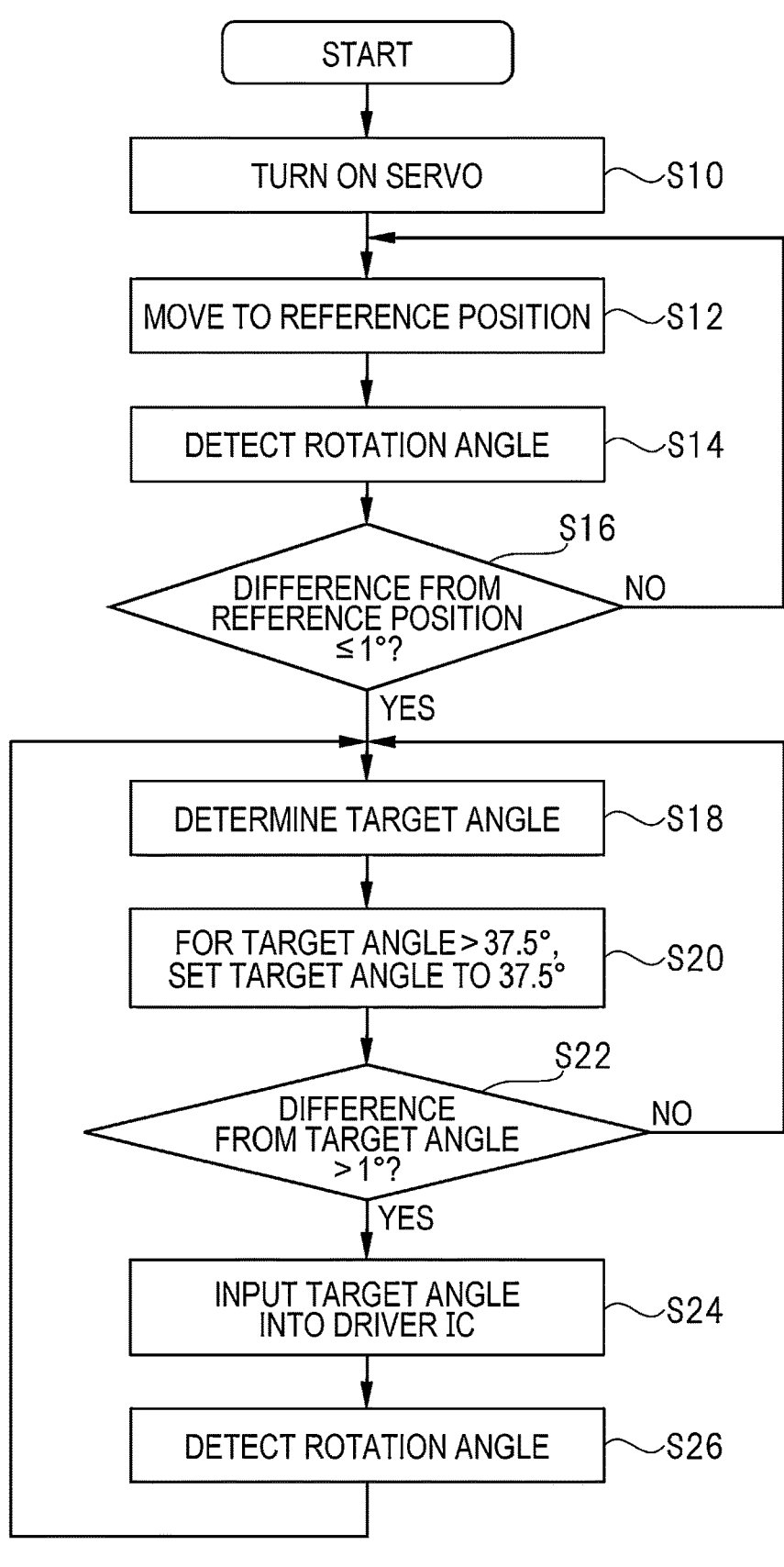
FIG. 14 is a flowchart of the steps for rotating the holder and the optical module to achieve a target rotation angle based on the outputs from a first sensor and a second sensor.

FIG. 14 is a flowchart of the steps for rotating the holder 42 and the optical module 12 to achieve a target rotation angle based on the outputs from the first sensor 112 and the second sensor 114 after the main power of the optical device 10 is turned on. The structures of the optical device 10 and the actuator 20 are described in FIG. 1 to FIG. 13B. The individual figure numbers will not be referred to below. Each step shown in FIG. 14 is performed by the CPU 202 that loads and executes a program (not shown) after reading the program from the memory 204.

In step S10, the CPU 202 turns on the servo by energizing the second coil 106. The processing then advances to step S12.

In step S12, the CPU 202 moves the holder 42 to the reference position by changing the current flow rate. The processing then advances to step S14.

In step S14, the CPU 202 detects the rotation angle of the holder 42 based on the detection result of the rotational position of the first magnetic member 66 from the first sensor 112. The processing then advances to step S16.

In step S16, the CPU 202 determines whether the difference between the rotational position of the holder 42 and the reference position is less than or equal to 1°. When the difference between the rotational position of the holder 42 and the reference position is less than or equal to 1° (Yes in S16), the processing advances to step S18. When the difference between the rotational position of the holder 42 and the reference position is greater than 1°(No in S16), the processing advances to step S12.

In step S18, the CPU 202 determines the target rotation angle for the holder 42 based on the input angle information. The processing then advances to step S20.

In step S20, when the target angle is greater than 37.5°, the CPU 202 sets the target angle to 37.5°. In other words, the upper limit of the target angle is, for example, 37.5°. The processing then advances to step S22.

In step S22, the CPU 202 determines whether the difference between the rotation angle of the holder 42 and the target angle is greater than 1°. When the difference between the rotation angle of the holder 42 and the target angle is greater than 1° (Yes in S22), the processing advances to step S24. When the difference between the rotation angle of the holder 42 and the target angle is less than or equal to 1° (No in S22), the processing advances to step S18.

In step S24, the CPU 202 inputs the target angle into the driver IC 110. The driver IC 110 starts energizing the second coil 106 based on the input information. This causes the holder 42 to start rotating from the reference position. The first coil 104 is then energized. The processing then advances to step S26.

In step S26, the CPU 202 detects the rotation angle of the holder 42 based on the outputs from the first sensor 112 and the second sensor 114. The processing then advances to step S18. Thus, after the program starts, the holder 42 continues to rotate (move) to achieve the target angle. When power off trigger information is input during the above sequence being performed in the optical device 10, the processing advances to a power off sequence in FIG. 15.

Figure 15:
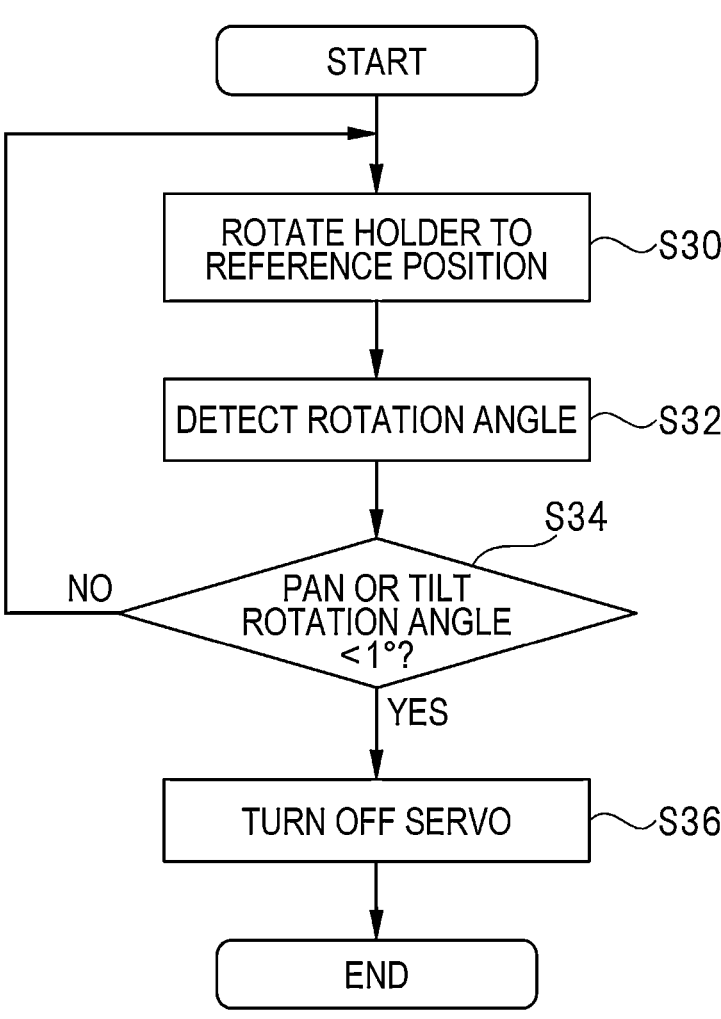
FIG. 15 is a flowchart of the steps for placing the holder and the optical module each at a reference position when the optical device is powered off.

FIG. 15 is a flowchart of the steps for turning off the optical device 10. The structures of the optical device 10 and the actuator 20 are described in FIG. 1 to FIG. 13B. The individual figure numbers will not be referred to below. Each step shown in FIG. 15 is performed by the CPU 202 that loads and executes a program (not shown) after reading the program from the memory 204.

In step S30, the CPU 202 inputs information into the driver IC 110 and rotates the holder 42 toward the reference position to place the holder 42 at the reference position. The processing then advances to step S32.

In step S32, the CPU 202 detects the rotation angle of the holder 42 based on the outputs from the first sensor 112 and the second sensor 114. The processing then advances to step S34.

In step S34, the CPU 202 determines whether the rotation angle of the holder 42 from the reference position is less than 1°. When the rotation angle of the holder 42 is less than 1° (Yes in S34), the processing advances to step S36. When the rotation angle of the holder 42 is greater than or equal to 1° (No in S34), the processing advances to step S30.

In step S36, the CPU 202 turns off the servo and ends the program. Thus, the power consumption of the optical device 10 can be reduced by setting the holding current of the actuator 20 to 0 (mA) when the optical device 10 is not in use.

Figure 16:
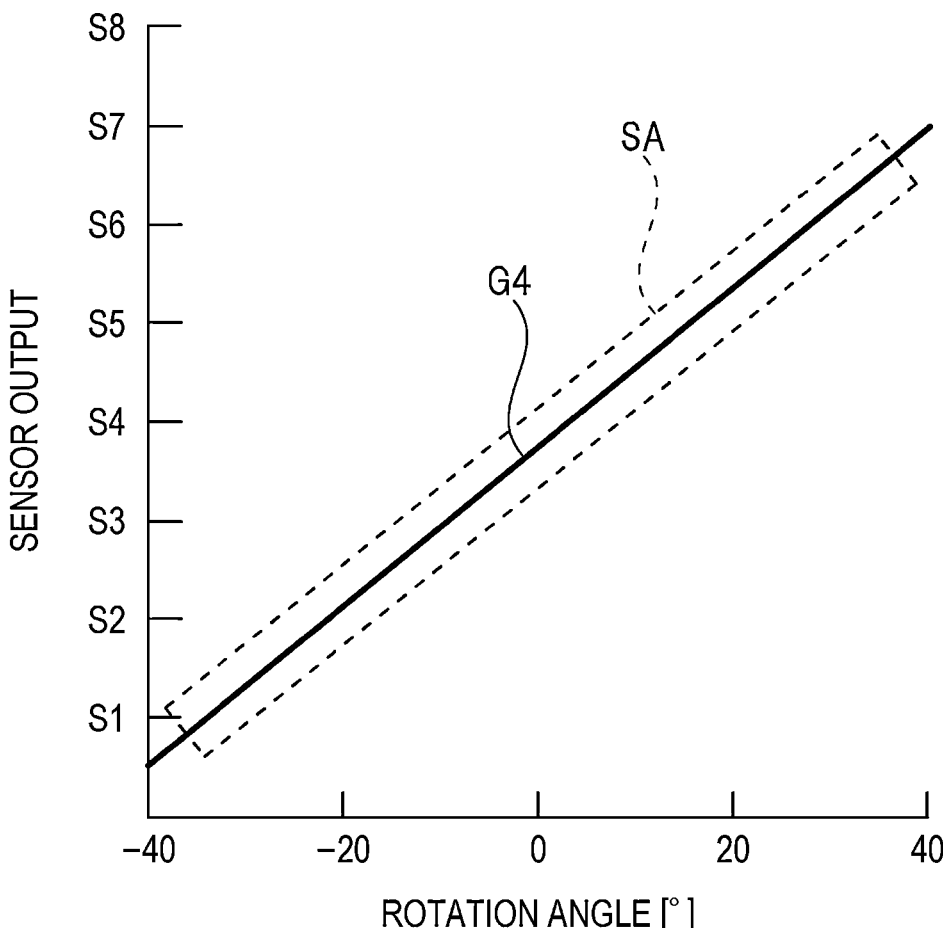
FIG. 16 is a graph showing the range of rotation angles restricted based on the relationship between the rotation angle of the holder and the outputs from the first sensor and the second sensor.

FIG. 16 shows the relationship between the rotation angle of the holder 42 and the output of the first sensor 112 (the same applies to the output of the second sensor 114) with a line G4. The line G4 shows the proportional relationship between the rotation angle and the sensor output. In FIG. 16, area SA surrounded by the dotted line represents an operating range within 95% of the rotation angle in a full stroke. In this manner, when, for example, the rotation angle of the holder 42 in a full stroke is set to 40° in the positive direction and 40° in the negative direction in the actuator 20, the rotation angle is controlled not to achieve 40°.

In the operation in a full stroke, the components may come into contact with one another and generate noise. The operation in a full stroke may also increase the current used for the rotational drive. Thus, setting the operating range (area SA) to within 95% of the rotation angle in a full stroke with a margin for error can reduce an increase in noise and power consumption.

With reference to FIGS. 1 to 16, the effects of the optical device 10 and the actuator 20 according to the first embodiment are described below. The individual figure numbers will not be referred to below.

The actuator 20 includes the first magnets 94 and the second magnets 98 located asymmetric to each other with respect to the reference point C. The first magnets 94 and the second magnets 98 have different lengths in the circumferential direction of the holder 42. When the coils 102 are energized and the second magnets 98 receive the main drive torque, the drive torque received from the coils 102 decreases as the rotation angle of the holder 42 increases, due to the second magnets 98 with less circumferential lengths than the first magnets 94.

The first magnets 94 have greater circumferential lengths than the second magnet 98 and are located asymmetric to the second magnets 98, thus receiving a wider range of the drive torque from the coil 102 than the second magnets 98. In other words, when the drive torque received by the second magnet 98 from the coil 102 decreases, the first magnet 94 can still receive the drive torque from the coil 102. When the drive torque acting on the second magnet 98 starts decreasing, the drive torque acting on the first magnet 94 is added to the drive torque to increase the total torque acting on the holder 42. In other words, the rotation angle of the optical module 12 can be increased.

The actuator 20 includes the coils 102 located in the radial direction in which the first magnets 94 and the second magnets 98 are aligned. Although the rotational shafts 82 cannot be arranged in the radial direction, the rotational shafts 82 extend in the intersecting direction intersecting with the radial direction, allowing the holder 42 to be rotated.

In the actuator 20, each first magnet 94 with two N poles and one S pole has the first length L1 greater than the second length L2 of the second magnet 98 with one pair of poles alone, with the N and S poles as one pair of poles. This allows one of the N pole or the S pole of each first magnet 94 to receive appropriate drive torque easily from the corresponding coil 102 at rotational angles at which the drive torque is reduced with the second magnets 98 alone. This increases the total torque, allowing the rotation angle of the optical module 12 to be increased.

The actuator 20 includes the first magnets 94 and the second magnets 98 with their N and S poles aligned in Z-direction, and the rotational shafts 82 including the first shafts 84 extending in X-direction and the second shafts 92 extending in Y-direction. This allows the holder 42 to rotate about the two axes, or the first rotation axis CX and the second rotation axis CY.

The actuator 20 includes one pair of first shafts 84 and one pair of second shafts 92 on the circular frame 72. The center of rotation by the first shafts 84 and the center of rotation by the second shafts 92 are both at the center of the frame 72. This allows the actuator 20 to be smaller, with the range in which the holder 42 moves inside the case 22 being limited compared with a structure in which the first shafts 84 and the second shafts 92 are located on separate members.

The actuator 20 includes the second shafts 92 slidable relative to the bearings 64. The second shafts 92 are thus easily attachable to the holder 42 as compared with the structure in which the second shafts 92 are placed into the holder 42.

The actuator 20 includes the bearings 64 that are non-magnetic. When the first magnetic member 66 is attached to the first shaft 84 and the second magnetic member 68 is attached to the second shafts 92, the magnetic force of the bearings 64 does not affect the direction of the magnetic force of the first magnetic member 66 or the magnetic force of the second magnetic member 68. This can reduce a decrease in the accuracy in detecting the rotational positions of the first shafts 84 with the first sensor 112 and the rotational positions of the second shafts 92 with the second sensor 114.

The actuator 20 includes the second shafts 92 that are non-magnetic. The magnetic force of the second shafts 92 thus does not affect the detection of the direction of the magnetic force of the second magnetic member 68 with the second sensor 114. The second sensor 114 can be located at an opposite position (at the back) of the second magnetic member 68 from the base 76. This allows the second sensor 114 to be located in the space between the base 76 and the frame 72. This eliminates an extra space for receiving the second sensor 114.

In the actuator 20, the bases 76 are located on the circular frame 72. The first shafts 84 and the second shafts 92 are located on the bases 76. In a comparative example, a structure includes the first shafts 84 and the second shafts 92 located directly on the frame 72, and the frame 72 may include a flat portion to avoid the first shafts 84 and the second shafts 92 from having the central axes deviated.

In the present embodiment, the first and second shafts 84 and 92 are located on the bases 76, and the frame 72 may not include a flat portion. This avoids deformation of the frame 72 resulting from such a flat portion being formed.

The actuator 20 includes the eccentric screws 74 placed in the four bases 76. This allows the position of the bases 76 in Z-direction with respect to the frame 72 and the position of the bases 76 in the circumferential direction of the frame 72 to be adjustable when the bases 76 are attached to the frame 72 with the eccentric screws 74.

The actuator 20 includes the first sensor 112 that detects the rotational positions of the first shafts 84 and the second sensor 114 that detects the rotational positions of the second shafts 92. This structure allows more accurate detection of the rotational angle of the holder 42 than in a structure that detects rotational positions of the first shafts 84 or the second shafts 92 alone.

In the actuator 20, the distance between the first sensor 112 and the first magnetic member 66 is less than the distance between the first sensor 112 and the first magnet 94. This can reduce the effect of the magnetic force of the first magnets 94 when the first sensor 112 detects the direction of the magnetic force of the first magnetic member 66. The distance between the second sensor 114 and the second magnetic member 68 is also less than the distance between the second sensor 114 and the second magnet 98. This can reduce the effect of the magnetic force of the second magnets 98 when the second sensor 114 detects the direction of the magnetic force of the second magnetic member 68.

The actuator 20 includes the FPCs 108 that extend through the frame 72 toward the relay position radially aligned with the first shafts 84 on the frame 72, and further extends from the relay position toward the case 22. This can reduce the proportion of the FPCs 108 to the entire portion of the FPCs 108 that is not supported by other members, compared with the structure including the FPCs 108 extending from the second sensor 114 toward the case 22. This further reduces deformation of the FPCs 108.

In the optical device 10, the increase in the drive torque acting on the holder 42 in the actuator 20 allows the rotation angle of the optical module 12 to be increased.

The optical device 10 includes the filter 62 in the opening 56 to reduce unintended light entering the optical module 12.

Components of Second Embodiment

Figure 17:
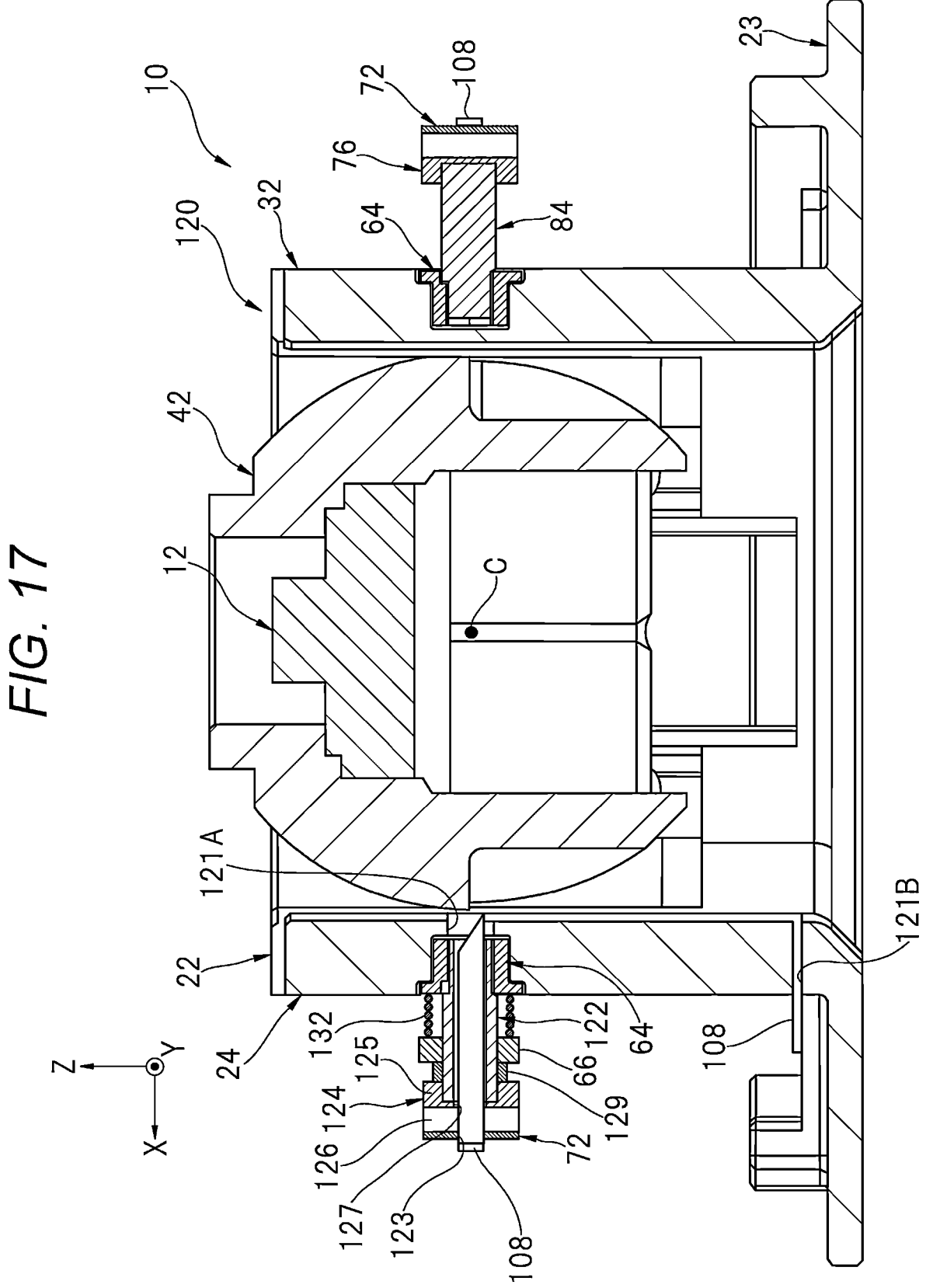
FIG. 17 is a cross-sectional view of an actuator according to a second embodiment with a flexible printed circuit (FPC) placed inside a rotational shaft.

FIG. 17 shows an optical device 10 with an actuator 120 according to a second embodiment. The same reference numerals denote the same or substantially the same components or elements as in the actuator 20 according to the first embodiment. Such components will not be described.

The actuator 120 has through-holes 121A and 121B in the support wall 24 of the actuator 20 (FIG. 2). The through-holes 121A and 121B extend through the support wall 24 in X-direction. The actuator 120 differs from the actuator 20 in including one first shaft 122 in place of one first shaft 84 (FIG. 5) and a base 124 in place of the base 76 (FIG. 5). A through-hole 123 is located in a portion of the frame 72 including the base 124.

The first shaft 122 is a cylinder having the first rotation axis CX (FIG. 3). The end of the first shaft 122 in the negative X-direction is supported by the bearing 64 in a rotatable manner. The first shaft 122 has an inner space connecting with the through-hole 121A. A first magnetic member 66 and a ring member 129 are attached to the first shaft 122. The ring member 129 is held between the base 124 and the first magnetic member 66.

The base 124 includes a flat plate 125 having a predetermined thickness in the radial direction of the frame 72 and legs 126 protruding from the flat plate 125 toward the frame 72. The flat plate 125 has a through-hole 127. The through-hole 127 connects with the through-hole 123. The through-hole 127 connects with the inner space of the first shaft 122.

An FPC 108 reaches the bottom wall 23 of the case 22 from the frame 72 through the inside of the first shaft 122. More specifically, the FPC 108 extends from the frame 72 through the through-hole 123, the through-hole 127, inside the first shaft 122, and the through-hole 121A to a position facing the holder 42, extends in the negative Z-direction while facing the holder 42, and extends in the positive X-direction through the through-hole 121B. The FPC 108 has two bent portions.

Figure 18:
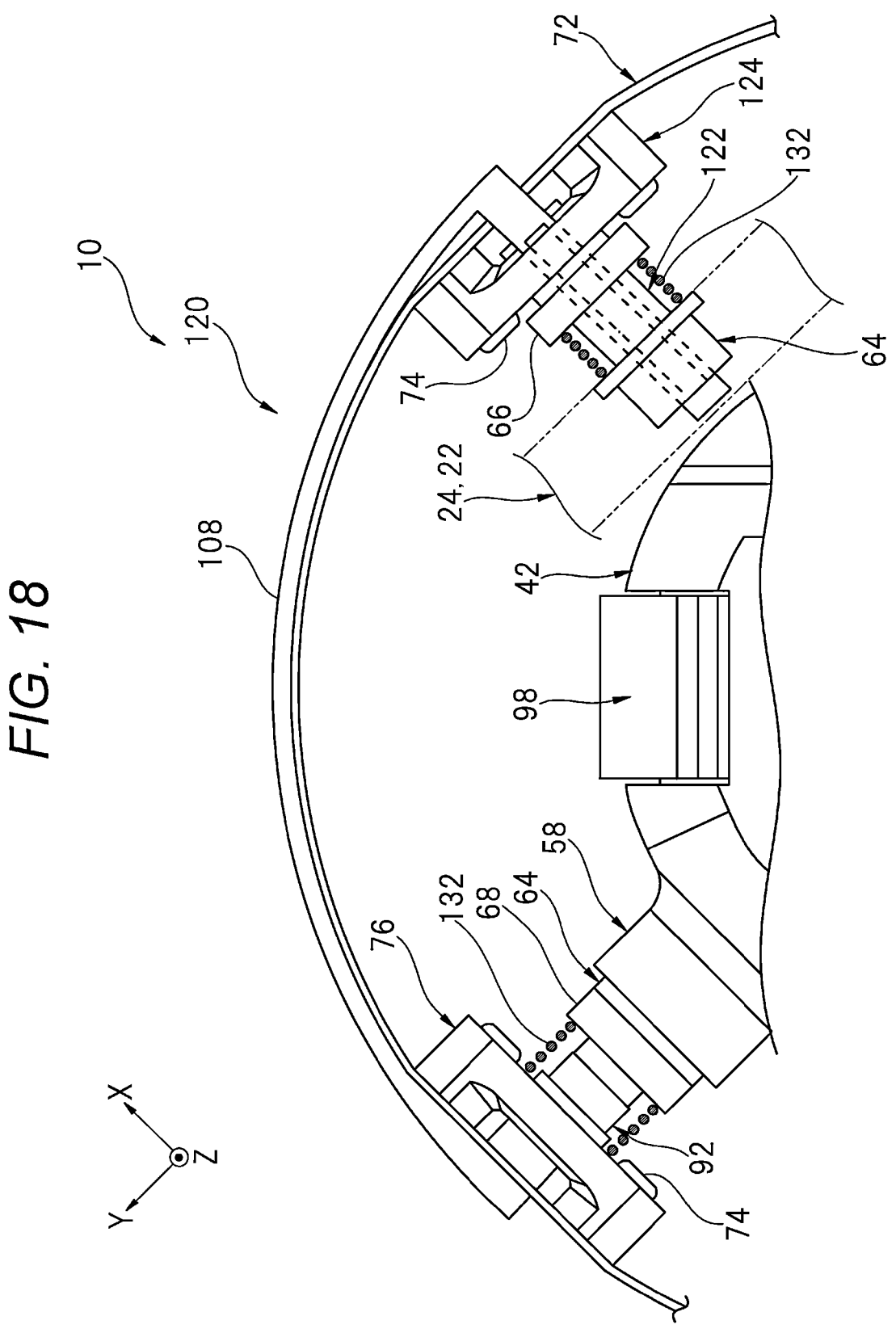
FIG. 18 is a diagram of the actuator according to the second embodiment including coil springs each located between a holder and a base.

As shown in FIG. 18, the actuator 120 includes coil springs 132 between the first magnetic member 66 and the bearing 64 in the first shaft 122 and between the second magnetic member 68 and the base 76 in the second shaft 92. The coil springs 132 are examples of an elastic member.

Effects of Second Embodiment

As shown in FIGS. 17 and 18, the actuator 120 includes the FPC 108 that reaches the support wall 24 (case 22) from the frame 72 through inside the first shaft 122. This reduces the likelihood that the tension of the FPC 108 acts as a load when the rotation angle of the holder 42 is changed.

The actuator 120 includes one coil spring 132 that presses the first magnetic member 66 toward the ring member 129 and the base 124. The other coil spring 132 presses the second magnetic member 68 toward the holder 42. This structure reduces tilt or misalignment of the first magnetic member 66 and the second magnetic member 68. The coil springs 132 as the elastic members allow the first shaft 122 and the second shaft 92 to be placed into the corresponding coil springs 132. The coil springs 132 in contact with the first shaft 122 and the second shaft 92 are less likely to be slipped off, allowing stable contact between the first magnetic member 66 and the coil spring 132 as well as between the second magnetic member 68 and the coil spring 132.

Modifications

Modifications different from the first and second embodiments will now be described. The same reference numerals denote the same or substantially the same components as in the first and second embodiments. Such components will not be described repeatedly.

First Modification

Figure 19:
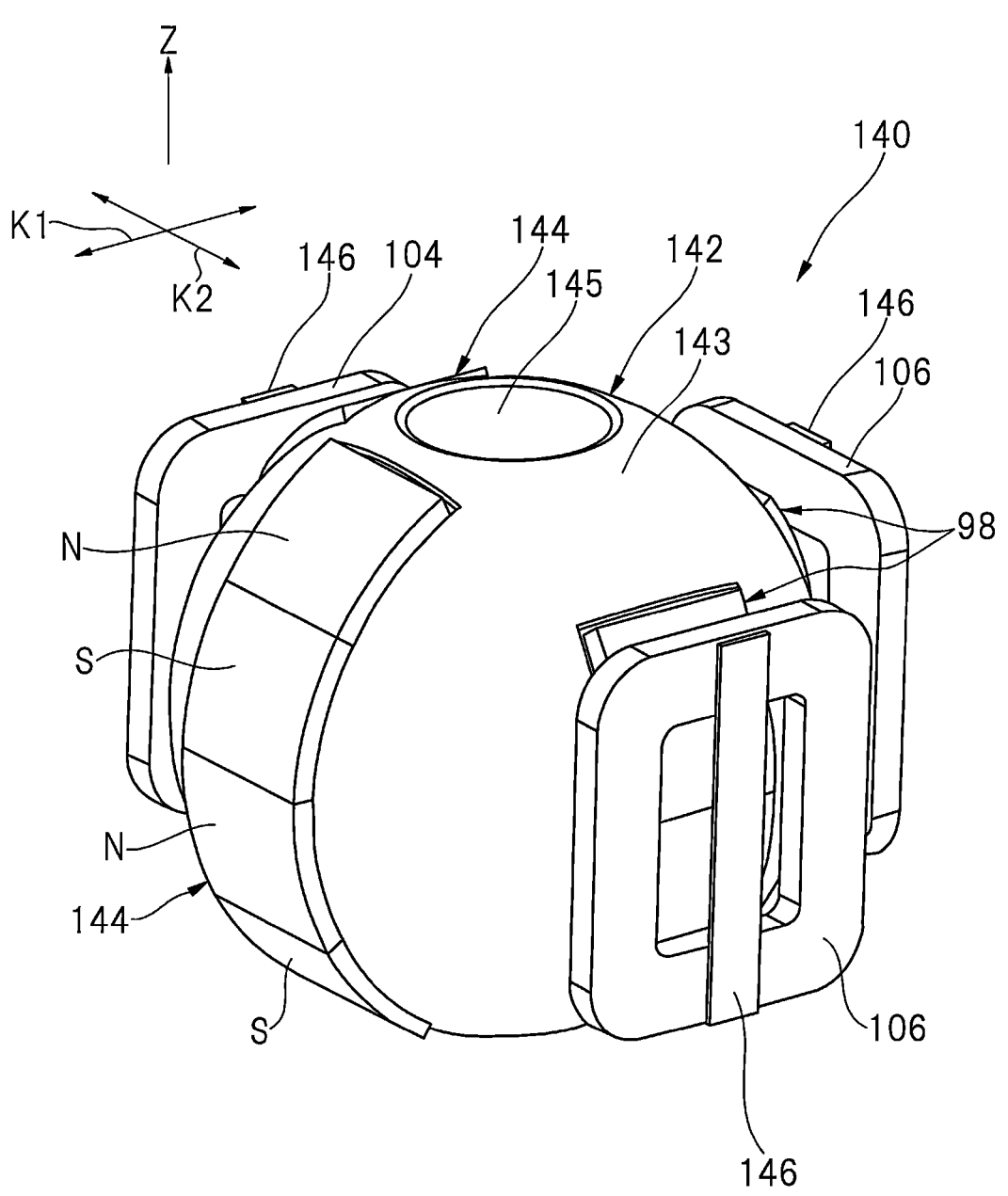
FIG. 19 is a perspective view of a holder and its peripheral components included in an actuator according to a first modification.

FIG. 19 shows a part of an actuator 140 according to a first modification. The actuator 140 differs from the actuator 20 (FIG. 2) in including a holder 142, first magnets 144, and holding plates 146. The other components are the same as in the actuator 20 and will not be described. In FIG. 19, components including the case 22, the FPCs 108 (FIG. 1), and one first coil 104 are not shown.

The holder 142 is spherical and has a spherical outer circumferential surface 143. The holder 142 has an opening 145 through which a drive target (not shown) is viewable. The holder 142 has, on the outer circumferential surface 143, two first magnets 144 and two second magnets 98.

The first magnets 144 face the first coils 104. The first magnets 144 each have the S pole, the N pole, the S pole, and the N pole aligned in this order from its end in the negative Z-direction to its end in the positive Z-direction. In other words, the first magnet 144 has an arrangement of magnetic poles different from the first magnet 94 (FIG. 8A). When the arrangement of the magnetic poles is changed, the drive torque acting on the first magnets 144 can still reduce a decrease in the total torque.

Each holding plate 146 is a magnetic member. Although not shown, FPCs 108 (FIG. 4) are located between the holding plate 146 and the first coil 104 as well as between the holding plate 146 and the second coil 106. The holding plate 146 has, for example, a width in the K1 direction less than the width of the first coil 104 and a width in the K2 direction less than the width of the second coil 106. The holding plate 146 has, for example, substantially the same height as the first coil 104 and the second coil 106 in Z-direction. The holding plate 146 may be embedded in the FPC 108 (FIG. 4).

When the FPCs 108 are not energized in the actuator 140, the magnetic holding plates 146 generate magnetic forces (attractive forces) acting between the holding plates 146 and the first magnets 144 as well as between the holding plates 146 and the second magnets 98. In other words, the holding plates 146 serve as magnetic springs. This stably places the holder 142 at the reference position before rotation, thus reducing an increase in the drive torque used for initially rotating the holder 142.

The actuator 140 also includes a first sensor 112 and a second sensor 114 (FIG. 3). Thus, the first sensor 112 and the second sensor 114 are not to be placed inside the first coil 104 and the second coil 106. The holding plate 146 may thus be placed inside the first coil 104 and the second coil 106.

Second Modification

Figure 20:
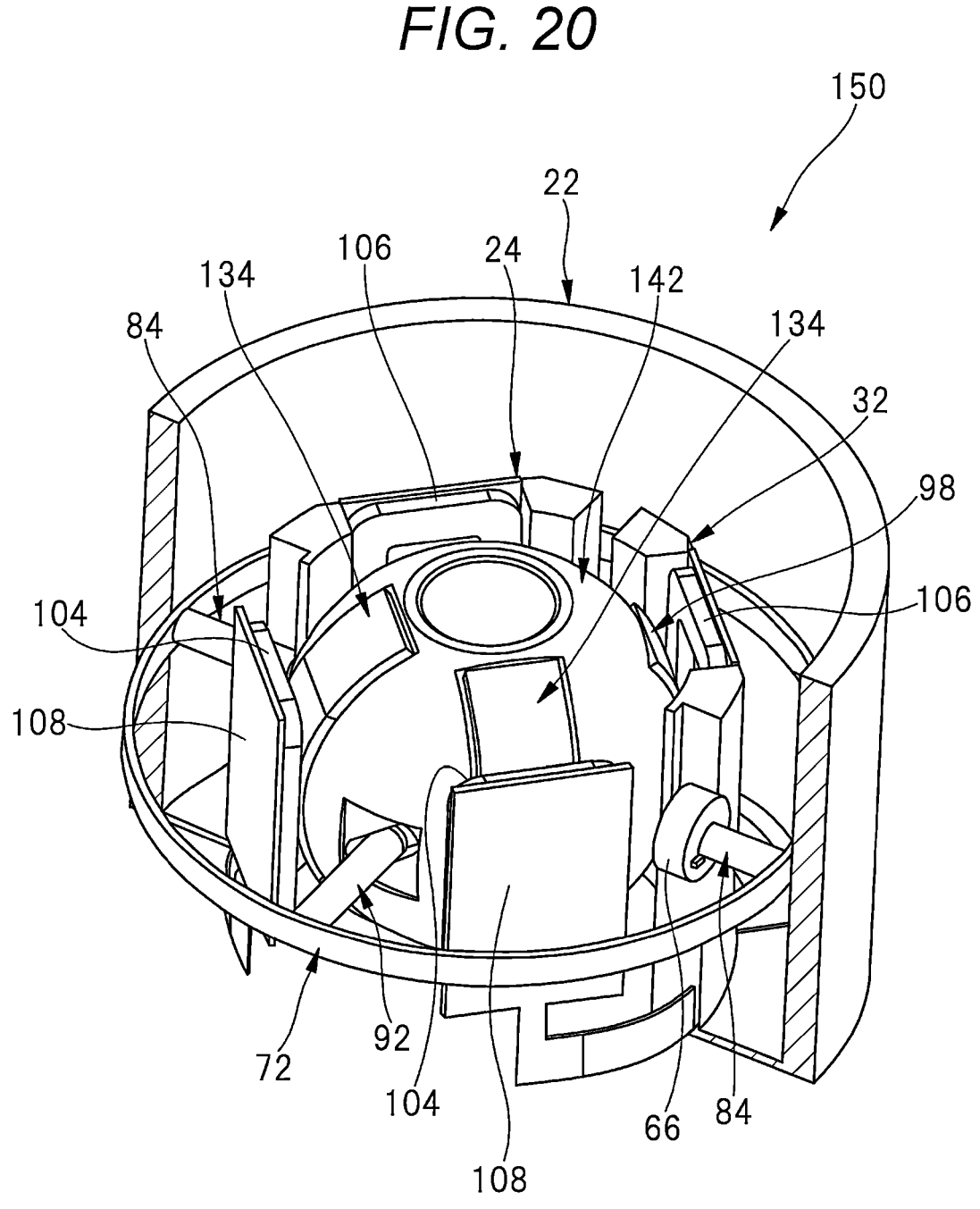
FIG. 20 is a perspective view of a holder supported in an actuator according to a second modification.

FIG. 20 shows a part of an actuator 150 according to a second modification. The actuator 150 differs from the actuator 140 according to the first modification (FIG. 19) in including the first shafts 84 and the second shafts 92 that are directly attached to the frame 72. The first shafts 84 are supported by the support walls 24 and 32 in a rotatable manner. The second shafts 92 support the holder 142 in a rotatable manner. This structure eliminates the bases 76 (FIG. 5).

Third Modification

Figure 21A:
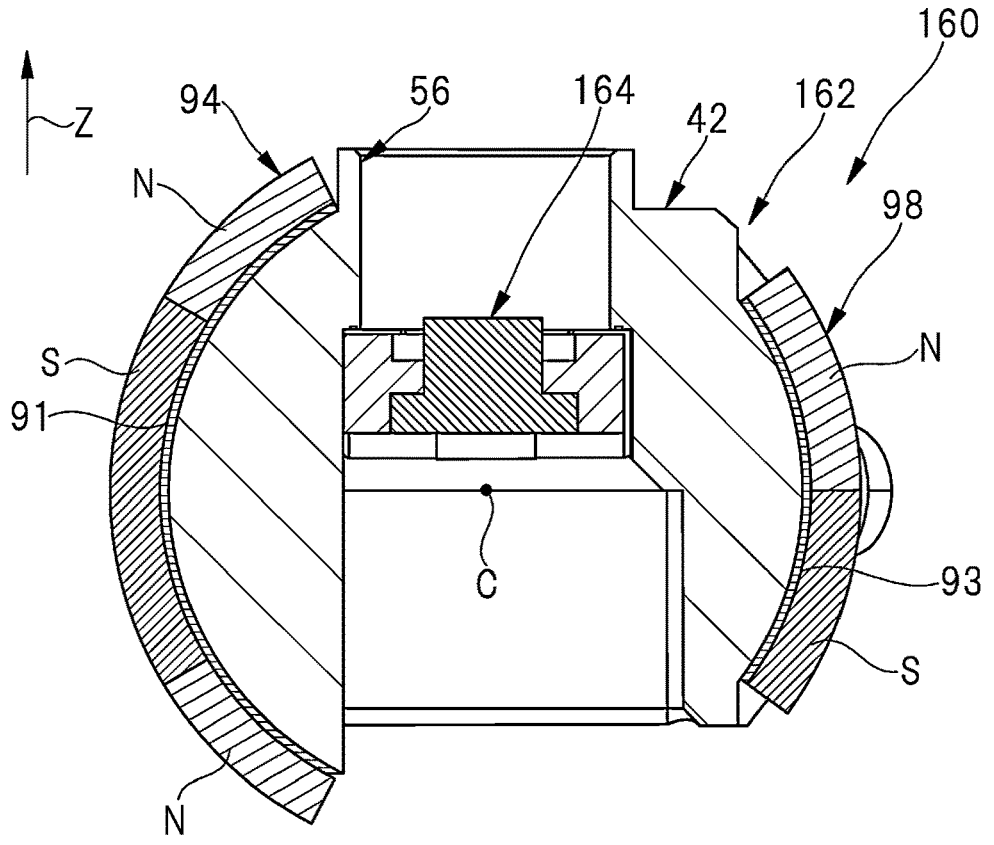
FIG. 21A is a cross-sectional view of an optical device according to a third modification of the first embodiment including a laser module.

FIG. 21A shows a part of an optical device 160 and an actuator 162 according to a third modification. The optical device 160 differs from the optical device 10 (FIG. 1) in including a laser module 164 in place of the optical module 12 (FIG. 1). The laser module 164 is housed and fixed inside the holder 42.

Figure 21B:
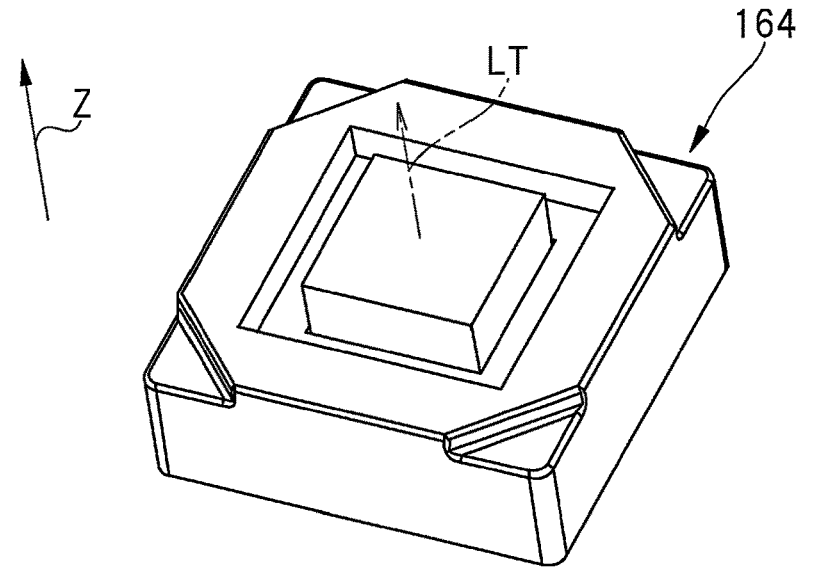
FIG. 21B is a perspective view of the laser module in FIG. 21A.

As shown in FIG. 21B, the laser module 164 emits light LT when energized by the driver IC (not shown). The laser module 164 is an example of the drive target. The optical device 160 that emits light may thus be used.

Fourth Modification

Figure 22A:
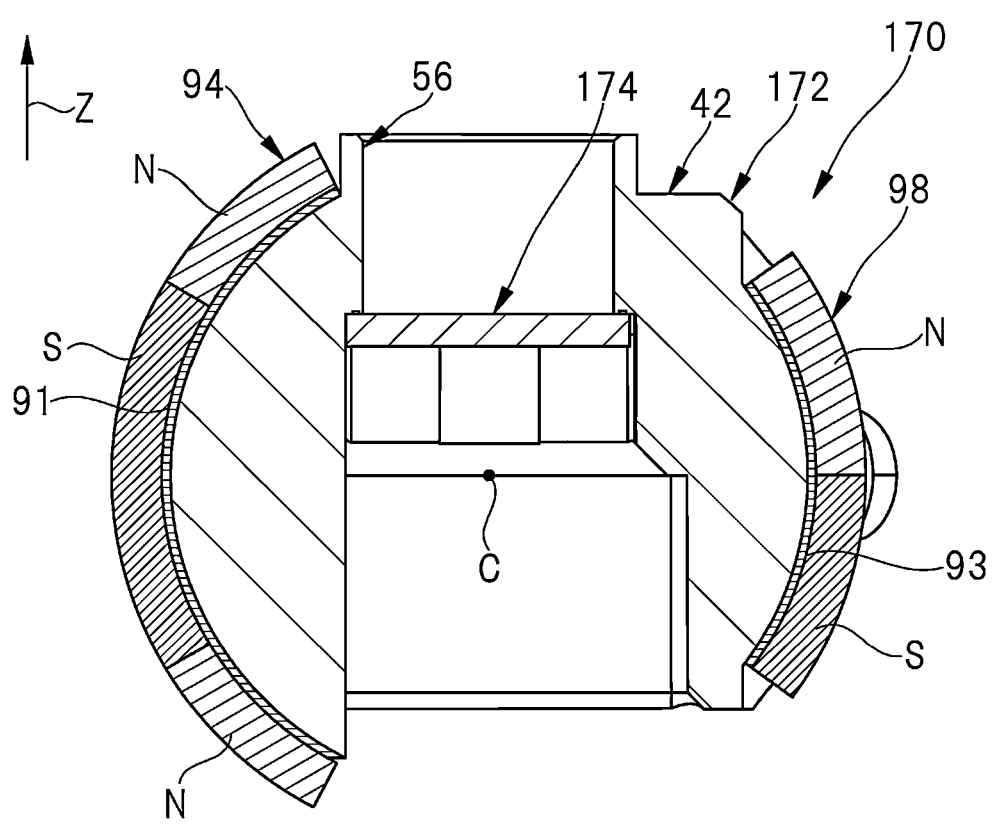
FIG. 22A is a cross-sectional view of an optical device according to a fourth modification of the first embodiment including a mirror.

FIG. 22A shows a part of an optical device 170 and an actuator 172 according to a fourth modification. The optical device 170 differs from the optical device 10 (FIG. 1) in including a mirror 174 in place of the optical module 12 (FIG. 1). The mirror 174 is housed and fixed inside the holder 42.

Figure 22B:
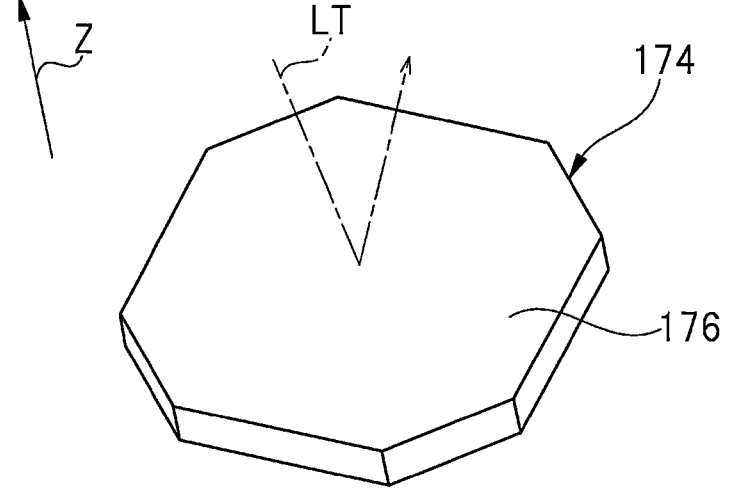
FIG. 22B is a perspective view of the mirror in FIG. 22A.

As shown in FIG. 22B, the mirror 174 has a reflective surface 176. The mirror 174 reflects light LT entering through the opening 56 (FIG. 22A) on the reflective surface 176. The mirror 174 is an example of the drive target. The optical device 170 may thus be used as a mirror module that reflects the entering light LT in a predetermined direction.

Fifth Modification

Figure 23:
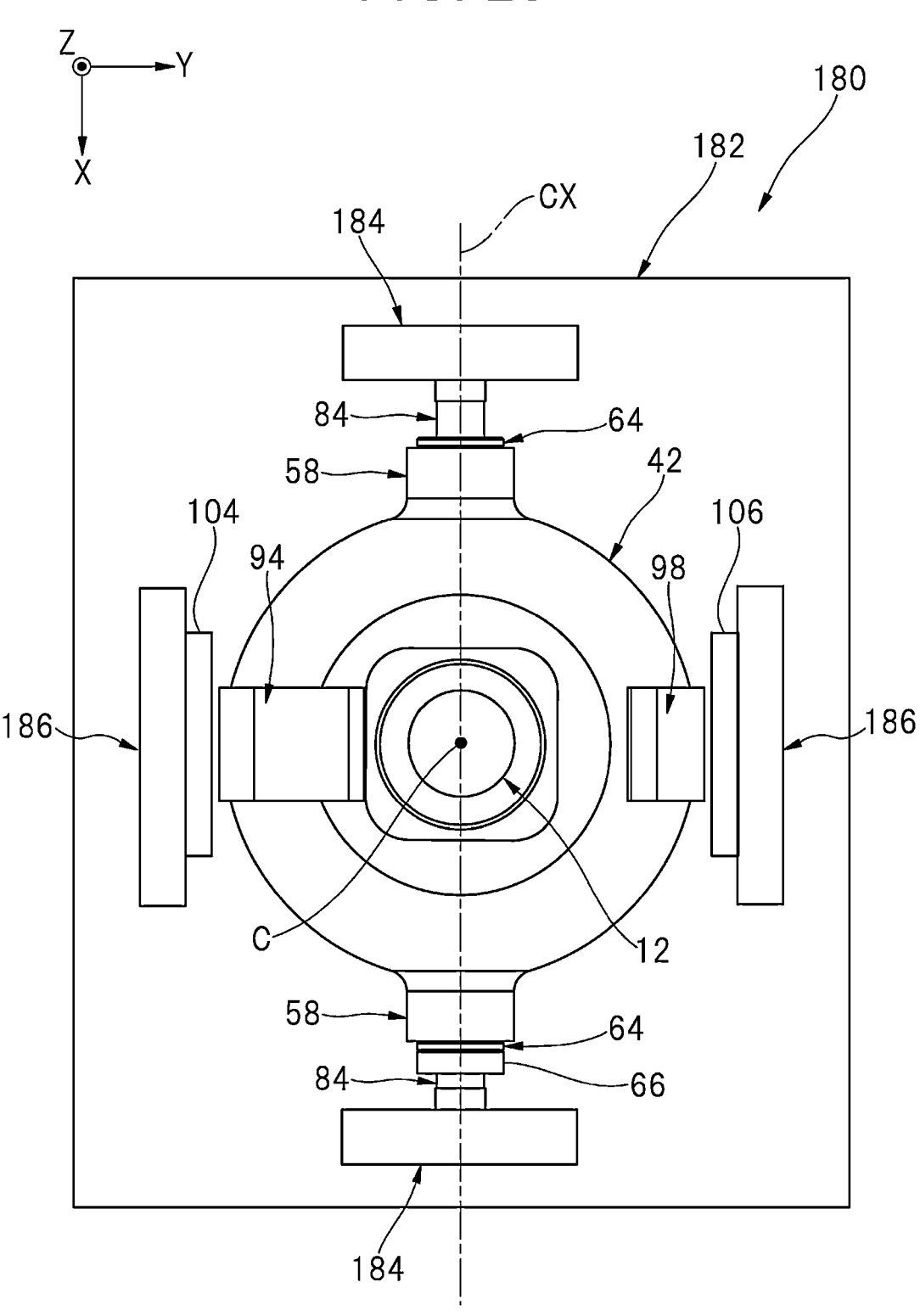
FIG. 23 is a plan view of an optical device and an actuator according to a fifth modification of the first embodiment including a single rotation axis.

FIG. 23 shows an optical device 180 according to a fifth modification. The optical device 180 includes a holder 42, a case 182, support walls 184, vertical walls 186, a first magnet 94, a second magnet 98, a first coil 104, and a second coil 106. The optical device 180 drives the optical module 12 in a rotatable manner. The case 182 houses the holder 42. The case 182 accommodates one pair (two) of support walls 184 and one pair (two) of vertical walls 186.

The support walls 184 are spaced from each other in X-direction and upright in Z-direction. The support walls 184 are examples of the support assembly that supports the holder 42 in a manner rotatable about the reference point C. The support walls 184 support the first shafts 84 in a manner rotatable about the first rotation axis CX. The first shafts 84 are connected to the holder 42 with the bearings 64. This allows the holder 42 to be rotatable about the first rotation axis CX.

The vertical walls 186 are spaced from each other in Y-direction and upright in Z-direction. The first coil 104 is fixed to the corresponding vertical wall 186 in the negative Y-direction. The second coil 106 is fixed to the vertical wall 186 in the positive Y-direction. The first coil 104 faces the first magnet 94. The second coil 106 faces the second magnet 98. The first magnet 94 and the second magnet 98 are located asymmetric to each other with respect to the reference point C and have different lengths in the circumferential direction of the holder 42.

The second coil 106 is energized with the holder 42 at the reference position. When drive torque acts on the second magnet 98 in the positive Z-direction, the rotating holder 42 causes the optical module 12 to rotate and tilt in the negative Y-direction. When drive torque acts on the second magnet 98 in the negative Z-direction, the rotating holder 42 causes the optical module 12 to rotate and tilt in the positive Y-direction.

When the rotation angle of the holder 42 increases and the drive torque acting on the second magnet 98 starts decreasing, the drive torque acting on the first magnet 94 from the first coil 104 is added to increase the total torque acting on the holder 42. In other words, the rotation angle of the optical module 12 can be increased. Thus, an optical device and an actuator that rotate about a single rotation axis may be used. The X-axis and Y-axis may be replaced, and the holder 42 may be rotated about a rotation axis extending in Y-direction.

Other Modifications

The present invention is not limited to any of the first and second embodiments and the first to fifth modifications described above, and can be modified in various ways such as combinations without departing from the spirit and scope of the invention.

The actuator 20 may include the second magnet 98 with multiple pairs of magnetic poles (N and S poles) and the first magnet 94 with more pairs of magnetic poles than the second magnet 98. The second magnet 98 may have multiple N poles, multiple S poles, or both. The frame 72 may be square as viewed in Z-direction. In this structure, the case 22 may be either cylindrical or rectangular to house the frame 72 in an operable manner. The numbers of S poles and N poles may be different from the numbers describe in the above embodiments and modifications.

The holder 42 may be directly connected to the second shafts 92 without the bearings 64. The bearing 64 may be magnetic. The pair of second shafts 92 may be magnetic. The first shafts 84 and the second shafts 92 may be located directly on the frame 72.

As the adjusters that adjust the positions of the bases 76, the structure may include non-eccentric screws and elongated holes elongated in the adjustment direction for position adjustment. The FPCs 108 may extend to the case 22 without passing through the frame 72.

The rotation angle of the holder 42 may be detected by detecting the rotation amount of the first magnets 94 and the second magnets 98 with, for example, a Hall device, without detecting the rotations of the first shafts 84 and the second shafts 92 with the first sensor 112 and the second sensor 114.

With less effect of the magnetic force of the first magnets 94 and the second magnets 98, the distance between the first sensor 112 and the first magnet 94 may be less than the distance between the first sensor 112 and the first magnetic member 66. The same applies to the second sensor 114, the second magnetic member 68, and the second magnets 98.

The actuator 120 may not include the coil springs 132. In other words, the first magnetic member 66 and the second magnetic member 68 may be fixed simply with, for example, an adhesive. Leaf springs may be used as the elastic members in place of the coil springs 132.

The optical device 10 may not include the filter 62.

The technique according to one or more embodiments of the present invention may provide the structure described below.

(1)

An actuator, comprising:

a holder including a sphere centered at a predetermined reference point, the holder being configured to house a drive target;

a case housing the holder;

a support assembly in the case, the support assembly supporting the holder in a manner rotatable about the predetermined reference point;

a first magnet on a portion of the sphere in a first radial direction from the predetermined reference point;

a second magnet on a portion of the sphere in a second radial direction from the predetermined reference point; and a coil in the case, the coil being configured to be energized to generate a magnetic field acting on the first magnet and the second magnet, wherein the first magnet and the second magnet are located asymmetric to each other with respect to the predetermined reference point and have different lengths in a circumferential direction of the holder.

(2)

The actuator according to (1), wherein the support assembly includes a rotational shaft rotatable about a rotation axis including the predetermined reference point and extending in an intersecting direction intersecting with a radial direction of the sphere, and each of the first magnet and the second magnet includes an N pole and an S pole aligned in an orthogonal direction orthogonal to the radial direction and the intersecting direction.

(3)

The actuator according to (2), wherein the first magnet includes a plurality of at least one of the N poles or the S poles, the second magnet includes a pair of magnetic poles, where the pair of magnetic poles include the N pole and the S pole, and the first magnet has a first length along the sphere greater than a second length of the second magnet along the sphere.

21

(4)

The actuator according to (2) or (3), wherein the rotation axis includes a first rotation axis and a second rotation axis orthogonal to each other, the rotational shaft includes a pair of first shafts rotatable about the first rotation axis, and a pair of second shafts supporting the holder in a manner rotatable about the second rotation axis, and the actuator includes two pairs of the first magnets, two pairs of the second magnets, and two pairs of the coils.

(5)

The actuator according to (4), wherein the support assembly includes a frame being circular and centered at the predetermined reference point, the pair of first shafts on the frame, and the pair of second shafts on the frame, and the pair of first shafts are supported by the case in a rotatable manner.

(6)

The actuator according to (5), further comprising:

bearings receiving the pair of second shafts in a slidable manner in the holder.

(7)

The actuator according to (6), wherein the bearings are non-magnetic.

(8)

The actuator according to any one of (5) to (7), wherein the pair of second shafts are non-magnetic.

(9)

The actuator according to any one of (6) to (8), wherein the support assembly includes a plurality of bases on the frame at intervals in a circumferential direction of the frame, and the pair of first shafts and the pair of second shafts are located on the plurality of bases.

(10)

The actuator according to (9), wherein the support assembly includes an adjuster configured to adjust positions the plurality of bases with respect to the frame.

(11)

The actuator according to (9) or (10), wherein a first shaft of the pair of first shafts includes a first magnetic member with a direction of a magnetic force changeable as the first shaft rotates, a second shaft of the pair of second shafts includes a second magnetic member with a direction of a magnetic force changeable as the second shaft rotates, and the actuator further comprises a first sensor in the case to detect a rotational position of the first shaft by detecting the direction of the magnetic force of the first magnetic member, and a second sensor on the frame to detect a rotational position of the second shaft by detecting the direction of the magnetic force of the second magnetic member.

(12)

The actuator according to (11), wherein a distance between the first sensor and the first magnetic member is less than a distance between the first sensor and the first magnet, and a distance between the second sensor and the second magnetic member is less than a distance between the second sensor and the second magnet.

22

(13)

The actuator according to (11) or (12), further comprising:

wiring electrically connected to the second sensor, wherein the wiring extends through the frame toward a relay position radially aligned with the pair of first shafts on the frame, and further extends from the relay position toward the case.

(14)

The actuator according to (13), wherein a first shaft of the pair of first shafts is cylindrical, and the wiring reaches the case from the frame through inside the first shaft.

(15)

The actuator according to any one of (11) to (14), further comprising:

an elastic member located at least one of a position between the first magnetic member and a corresponding bearing of the bearings or a position between the second magnetic member and a corresponding base of the plurality of bases.

(16)

The actuator according to (15), wherein the elastic member is a coil spring.

(17)

An actuator, comprising:

a holder configured to house a drive target;

a case housing the holder;

a support assembly in the case, the support assembly supporting the holder in a manner rotatable about a predetermined reference point;

a first magnet on a portion of the holder in a first radial direction of a rotation circle from the predetermined reference point, the rotation circle being a path of the holder rotating about the predetermined reference point;

a second magnet on a portion of the holder in a second radial direction of the rotation circle from the predetermined reference point; and a coil in the case, the coil being configured to be energized to generate a magnetic field acting on the first magnet and the second magnet, wherein the first magnet and the second magnet are located asymmetric to each other with respect to the predetermined reference point and have different lengths in a circumferential direction of the rotation circle.

(18)

An optical device, comprising:

an optical module with an optical axis;

a holder including a sphere centered at a predetermined reference point and housing the optical module;

a case housing the holder;

a support assembly in the case, the support assembly supporting the holder in a manner rotatable about the predetermined reference point;

a first magnet on a portion of the sphere in a first radial direction from the predetermined reference point;

a second magnet on a portion of the sphere in a second radial direction from the predetermined reference point; and a coil in the case, the coil being configured to be energized to generate a magnetic field acting on the first magnet and the second magnet, wherein the first magnet and the second magnet are located asymmetric to each other with respect to the predetermined reference point and have different lengths in a circumferential direction of the holder.

(19)

The optical device according to (18), wherein
the holder has an opening being open in a direction along
the optical axis, and
the optical device further comprises a filter in the opening
to selectively transmit a portion of light entering the
opening from outside.

What is claimed is:

1. An actuator, comprising:
a holder including a sphere centered at a predetermined
reference point, the holder being configured to house a
drive target;
a case housing the holder;
a support assembly in the case, the support assembly
supporting the holder in a manner rotatable about the
predetermined reference point;
a first magnet on a portion of the sphere in a first radial
direction from the predetermined reference point;
a second magnet on a portion of the sphere in a second
radial direction from the predetermined reference
point; and
a coil in the case, the coil being configured to be energized
to generate a magnetic field acting on the first magnet
and the second magnet,
wherein the first magnet and the second magnet are
located asymmetric to each other with respect to the
predetermined reference point and have different
lengths in a circumferential direction of the holder.

2. The actuator according to claim 1, wherein
the support assembly includes a rotational shaft rotatable
about a rotation axis including the predetermined ref-
erence point and extending in an intersecting direction
intersecting with a radial direction of the sphere, and
each of the first magnet and the second magnet includes
an N pole and an S pole aligned in an orthogonal
direction orthogonal to the radial direction and the
intersecting direction.

3. The actuator according to claim 2, wherein
the first magnet includes a plurality of at least one of the
N poles or the S poles,
the second magnet includes a pair of magnetic poles,
where the pair of magnetic poles include the N pole and
the S pole, and
the first magnet has a first length along the sphere greater
than a second length of the second magnet along the
sphere.

4. The actuator according to claim 3, wherein
the rotation axis includes a first rotation axis and a second
rotation axis orthogonal to each other,
the rotational shaft includes a pair of first shafts rotatable
about the first rotation axis, and a pair of second shafts
supporting the holder in a manner rotatable about the
second rotation axis, and
the actuator includes two pairs of the first magnets, two
pairs of the second magnets, and two pairs of the coils.

5. The actuator according to claim 4, wherein
the support assembly includes
a frame being circular and centered at the predeter-
mined reference point,
the pair of first shafts on the frame, and
the pair of second shafts on the frame, and
the pair of first shafts are supported by the case in a
rotatable manner.

6. The actuator according to claim 5, further comprising:
bearings receiving the pair of second shafts in a slidable
manner in the holder.

7. The actuator according to claim 6, wherein
the bearings are non-magnetic.

8. The actuator according to claim 7, wherein
the pair of second shafts are non-magnetic.

9. The actuator according to claim 6, wherein
the support assembly includes a plurality of bases on the
frame at intervals in a circumferential direction of the
frame, and
the pair of first shafts and the pair of second shafts are
located on the plurality of bases.

10. The actuator according to claim 9, wherein
the support assembly includes an adjuster configured to
adjust positions the plurality of bases with respect to
the frame.

11. The actuator according to claim 9, wherein
a first shaft of the pair of first shafts includes a first
magnetic member with a direction of a magnetic force
changeable as the first shaft rotates,
a second shaft of the pair of second shafts includes a
second magnetic member with a direction of a mag-
netic force changeable as the second shaft rotates, and
the actuator further comprises
a first sensor in the case to detect a rotational position
of the first shaft by detecting the direction of the
magnetic force of the first magnetic member, and
a second sensor on the frame to detect a rotational
position of the second shaft by detecting the direc-
tion of the magnetic force of the second magnetic
member.

12. The actuator according to claim 11, wherein
a distance between the first sensor and the first magnetic
member is less than a distance between the first sensor
and the first magnet, and
a distance between the second sensor and the second
magnetic member is less than a distance between the
second sensor and the second magnet.

13. The actuator according to claim 11, further compris-
ing:
wiring electrically connected to the second sensor,
wherein the wiring extends through the frame toward a
relay position radially aligned with the pair of first
shafts on the frame, and further extends from the relay
position toward the case.

14. The actuator according to claim 13, wherein
a first shaft of the pair of first shafts is cylindrical, and
the wiring reaches the case from the frame through inside
the first shaft.

15. The actuator according to claim 11, further compris-
ing:
an elastic member located at least one of a position
between the first magnetic member and a correspond-
ing bearing of the bearings or a position between the
second magnetic member and a corresponding base of
the plurality of bases.

16. The actuator according to claim 15, wherein
the elastic member is a coil spring.

17. An actuator, comprising:
a holder configured to house a drive target;
a case housing the holder;
a support assembly in the case, the support assembly
supporting the holder in a manner rotatable about a
predetermined reference point;
a first magnet on a portion of the holder in a first radial
direction of a rotation circle from the predetermined
reference point, the rotation circle being a path of the
holder rotating about the predetermined reference
point;

a second magnet on a portion of the holder in a second radial direction of the rotation circle from the predetermined reference point; and a coil in the case, the coil being configured to be energized to generate a magnetic field acting on the first magnet and the second magnet, wherein the first magnet and the second magnet are located asymmetric to each other with respect to the predetermined reference point and have different lengths in a circumferential direction of the rotation circle.

18. An optical device, comprising:

an optical module with an optical axis;

a holder including a sphere centered at a predetermined reference point and housing the optical module;

a case housing the holder;

a support assembly in the case, the support assembly supporting the holder in a manner rotatable about the predetermined reference point;

a first magnet on a portion of the sphere in a first radial direction from the predetermined reference point;

a second magnet on a portion of the sphere in a second radial direction from the predetermined reference point; and a coil in the case, the coil being configured to be energized to generate a magnetic field acting on the first magnet and the second magnet, wherein the first magnet and the second magnet are located asymmetric to each other with respect to the predetermined reference point and have different lengths in a circumferential direction of the holder.

19. The optical device according to claim 18, wherein the holder has an opening being open in a direction along the optical axis, and the optical device further comprises a filter in the opening to selectively transmit a portion of light entering the opening from outside.

* * * * *